(12) United States Patent
Wakisaka et al.

(10) Patent No.: US 8,199,377 B2
(45) Date of Patent: Jun. 12, 2012

(54) IMAGE SENSOR AND IMAGE READING DEVICE

(75) Inventors: Masahide Wakisaka, Minato-ku (JP); Harunobu Yoshida, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 841 days.

(21) Appl. No.: 11/916,759

(22) PCT Filed: May 6, 2006

(86) PCT No.: PCT/JP2006/311233
§ 371 (c)(1),
(2), (4) Date: Dec. 22, 2008

(87) PCT Pub. No.: WO2006/132186
PCT Pub. Date: Dec. 14, 2006

(65) Prior Publication Data
US 2009/0135453 A1      May 28, 2009

(30) Foreign Application Priority Data

Jun. 7, 2005 (JP) ................... 2005-166572
Aug. 2, 2005 (JP) ................... 2005-223844
Aug. 26, 2005 (JP) ................... 2005-245121
Mar. 7, 2006 (JP) ................... 2006-060945

(51) Int. Cl.
*H04N 1/04* (2006.01)
(52) U.S. Cl. ............ 358/475; 358/482; 358/483
(58) Field of Classification Search ............ 358/475, 358/509, 487, 506; 399/220, 221; 355/67; 362/600, 611–615; 257/79; 250/208.1, 239, 216
See application file for complete search history.

(56) References Cited

U.S. PATENT DOCUMENTS

| | | | |
|---|---|---|---|
| 6,181,442 B1 * | 1/2001 | Ogura et al. | 358/475 |
| 6,337,476 B2 * | 1/2002 | Tabata | 250/208.1 |
| 7,385,169 B2 * | 6/2008 | Saitou et al. | 250/208.1 |
| 7,719,012 B2 * | 5/2010 | Sugimoto et al. | 257/79 |

(Continued)

FOREIGN PATENT DOCUMENTS

JP      04128811 A   *   4/1992

(Continued)

OTHER PUBLICATIONS

International Search Report Date Aug. 18, 2006.

*Primary Examiner* — Cheukfan Lee
(74) *Attorney, Agent, or Firm* — RatnerPrestia

(57) ABSTRACT

There is provided an image sensor in which an enlargement of a substrate width is not caused even in a case that a rod-shaped light source is provided on both sides of a resin lens plate, respectively, and in which a positional accuracy of component is superior. The image sensor comprises a rod-shaped light source for irradiating light to an original placed on an original glass plate, an imaging optics for focusing light reflected on the original, and a light-receiving element for receiving light passing through the imaging optics, the light-receiving element being positioned at a predetermined location on a substrate which is provided with through holes for terminals of lead frames of the rod-shaped light source. The terminals of lead frames of the rod-shaped light source are bent toward the center of the substrate to be connected with the through holes.

14 Claims, 25 Drawing Sheets

U.S. PATENT DOCUMENTS

| | | | |
|---|---|---|---|
| 7,835,039 B2 * | 11/2010 | Lee et al. | 358/475 |
| 2005/0006562 A1 * | 1/2005 | Sugihara et al. | 250/208.1 |

FOREIGN PATENT DOCUMENTS

| | | |
|---|---|---|
| JP | 28699/1991 | 10/1992 |
| JP | 05-183681 | 7/1993 |
| JP | 05-304579 | 11/1993 |
| JP | 2000-134411 | 5/2000 |
| JP | 2000-270174 | 9/2000 |
| JP | 2003-202411 | 7/2003 |
| JP | 2003-344955 | 12/2003 |
| JP | 2005-033299 | 2/2005 |
| JP | 2005-086482 | 3/2005 |
| JP | 2004-193839 | 7/2005 |

* cited by examiner (a)

(b)

IMAGE SENSOR AND IMAGE READING DEVICE

TECHNICAL FIELD

The present invention relates to an image sensor and an image reading device comprising the image sensor, in particular intends to compactify an image sensor substrate.

The present invention also relates to prevent ghost and stray light from generating in an imaging optics mounted on a unit for a writing optics of a light printer etc. or a reading optics of a scanner etc.

The present invention further relates to an effective improvement for a positional accuracy of a slit with respect to an optical axis, and an accuracy of the distance between a reading optics and an original glass plate.

BACKGROUND ART

An image sensor is mounted on a unit for a writing optics of a light printer etc., or a reading optics of a scanner etc. As shown in FIG. 1, a contact image sensor comprises a rod-shaped light source 1, an imaging optics 2, and a light-receiving element (a line image sensor) 3. An original (or referred to as an image to be read) 4 is irradiated by the light from the rod-shaped light source 1 and the light reflected on the original 4 is detected by the light-receiving element 3 via the imaging optics 2. In the figure, reference numeral 5 designates a substrate.

As the imaging optics 2, a rod lens array composed of a plurality of gradient index rod lens or a planar lens array such as a planar microlens array etc. (refer to Japanese Patent Publication No. 202411/2003) is used.

In a scanner mounted on a copy machine, a cold-cathode tube having a low light directivity and high luminance has been generally used as a light source, because a scan for books etc. is required.

However, a cold-cathode tube utilizes material such as mercury having an adversary effect on circumstances, so that the displacement of a cold-cathode tube with a rod-shaped light source using an LED etc. has been considered.

Also, a planar lens array described above comprises a plurality of spherical or aspherical microlens arranged regularly in a predetermined pitch on a plate, and a transparent resin etc. is used for the material of which such a planar lens array is made. The important matter in such an imaging optics is to effectively prevent the generation of ghost and stray light which are causes for the degradation of image quality. For that purpose, the light which dose not contribute to imaging should not be incident on lenses, so that a light shielding film is formed on the surface of lenses.

However, it is impossible to prevent stray light from generating in a lens only by the formation of a light shielding film on the surface of lenses. In order to prevent stray light from generating in lenses, respective lenses should be isolated so that unnecessary light is not incident on a given lens from neighbored lenses. In a case that a planar lens array is fabricated by an integral molding such as an injection molding, a light shielding film may not be formed in a lens.

DISCLOSURE OF THE INVENTION

Problems to be Solved

In a contact image sensor utilizing a rod-shaped light source using an LED, the rod-shaped light source is positioned on only one side to a sensor element in a sub-scanning direction as shown in FIG. 2, and a rod lens having a short focal length is utilized. As a result, when an original such as a book is scanned, a reading image becomes fuzzy due to the degradation of illuminance on the original by a space caused between the original and the original glass plate, and due to the out-of-focus of a lens, so that the quality of reading image is remarkably degraded.

For preventing the fuzziness of a reading image due to the out-of-focus of a lens, a resin lens which has a relatively long depth of focus may be utilized.

In order to prevent a shade of illumination to an original from generating, a rod-shaped light source is provided on both sides of a resin lens plate, respectively.

However, in a case that a rod-shaped light source is provided on both sides of a resin lens plate respectively, the width of a substrate is enlarged, resulting in the increase of cost of members.

As shown in FIG. 3, in order to implement the electrical connection between the rod-shaped light source 1 and the substrate 5, it is required to provide the substrate 5 with through holes 7 at the terminal positions of lead frames 6 which are means for electrically connecting the rod-shaped light source 1 to the substrate 5. However, the arrangement of through holes 7 causes the enlargement of the substrate, resulting in the increase of cost and the inevitable growth in size of a device. In the figure, dotted-lines show the electrical connection between the substrate and the rod-shaped light source positioned on the opposite end of the substrate 5 (this is the same as in the following figures).

In order to prevent the generation of ghost and stray light in the lens, it is conceivable to provide a slit over the resin lens plate (on the side on which the light from an original is incident).

The slit is generally formed in a hood member so as to make the built-in to an image sensor easier. However, a rod-shaped light source is positioned in proximity to an optical axis of a sensor in a contact image sensor, so that a part of the light path of the light source is blocked by the hood provided with a slit. As a result, a part of irradiation light to an original is interrupted.

The amount of light irradiating an original is increasing as the distance between the light source and the original is decreased, so that the light source is required to be positioned in proximity to the optical axis of a sensor. This is important in a case that a planar lens array is particularly used as an imaging optics, because the width of the planar lens array is increased.

However, in a case that a rod-shaped light source is arranged at the position where the amount of light irradiated on the original is maximum, a part of irradiation light is interrupted by the hood, resulting in the decrease of the amount of light. On the other hand, if a rod-shaped light source is arranged at the position where an irradiation light is not interrupted, then the distance between the light source and the surface of an original is increased. As a result, the amount of light irradiated on the original is decreased, and the quality of image is degraded.

In order to prevent all of ghosts effectively, the slit should has a high aperture accuracy and high linear accuracy, i.e., a light-receiving accuracy through a longitudinal direction of a planar lens array. Also, when light reflects diffusely at an aperture of the slit, ghost is generated to degrade the image quality.

If the hood having a slit is made of resin by an injection mold etc., a light-receiving accuracy is degraded because a resin molded component has a weak strength for retaining its own shape. As a result, it becomes impossible to prevent the generation of ghost at any positions in a longitudinal direction of a planar lens array.

Means for Resolving Problems

The present invention intends to solve problems described above, and the objects of the present invention are followings:

1. to provide an image sensor in which an enlargement of a substrate width is not caused even in a case that a rod-shaped light source is provided on both sides of a resin lens plate, respectively, and in which a positional accuracy of component is superior, 2. to provide a contact image sensor in which a light source may be positioned in proximity to an optical axis of a sensor even in a case that the hood having a slit is provided, and then the amount of irradiation light is not decreased, 3. to provide a contact image sensor of a superior imaging accuracy, the contact image sensor comprising a hood having a slit which has the high strength for retaining its own shape and a high light-receiving accuracy, 4. to provide an image sensor in which the generation of ghost may be effectively prevented by more accurately positioning the slit with respect to the optical axis, 5. to provide an image sensor in which an image quality may be further improved by increasing an accuracy in the distance between a reading optics and an original glass plate, and 6. to provide an image sensor which may easily be carried and treated by mounting a housing including a reading optics on a base frame.

The inventers of the present invention have devoted to themselves to studying in order to solve the problems described above, and have obtained following knowledges.

1. The width of a substrate may be reduced by bending the terminals of lead frames of the rod-shaped light source toward the center of the substrate.

2. The positioning adjustment of parts becomes easy together with the reduction of the substrate width by connecting the terminals of lead frames of the rod-shaped light source to the through holes via electrical conductors.

3. When a metal plate is used as a material of the hood, the wall thickness may be thin so that the light from the light source is hard to be interrupted. Furthermore, when the corner portion of the hood is chamfered, the light from the light source is hard to be interrupted, even if the light source is approached to an original.

4. When the hood having a slit is made of metal, the strength for retaining its own shape becomes high, so that an imaging accuracy is improved. When a bent portion is provided to the hood along the longitudinal direction of the slit in order to increase the strength of the hood, an imaging accuracy is further improved. When the slit is opened by punching out the hood from the incident side of light, the slit having a trapezoidal cross-sectional shape may be realized. As a result, an irregular reflection at a slit opening may be prevented.

5. The generation of stray light (flare) may be effectively prevented by the execution of a suitable surface treatment to a front and rear surface of the hood.

6. The positional accuracy of the slit with respect to an optical axis may be improved by providing the hood and housing with positioning holes, and inserting positioning pins into the positioning holes to fix the hood and housing. It should be noted that the securing of the positional accuracy has been very difficult conventionally in a case that a light source is provided on both sides of an imaging optics, respectively.

7. When the hood and housing are fixed by the above-described positioning pins, the positioning pins are provided at the upper portions on both ends in a main scanning direction of the hood and housing, the height of the positioning pin protruding from the upper surface of the hood is constant, and a compression coil is provided to press the hood to an original glass plate. In this case, the accuracy of the distance between the optical optics and an original may be extremely improved.

8. When a housing including a reading optics is mounted on a base frame, the structure such that the housing is hard to be dropped off from the base frame is adopted. As a result, an image sensor may easily be carried and treated.

The present invention is based on the above-described knowledges.

The subject matters of the present invention are as follows.

(1) An image sensor comprising a rod-shaped light source for irradiating light to an original placed on an original glass plate, an imaging optics for focusing light reflected on the original, and a light-receiving element for receiving light passing through the imaging optics, the light-receiving element being positioned at a predetermined location on a substrate which is provided with through holes for terminals of lead frames of the rod-shaped light source, characterized in that the terminals of lead frames of the rod-shaped light source are bent toward the center of the substrate to be connected with the through holes.

(2) An image sensor comprising a rod-shaped light source for irradiating light to an original placed on an original glass plate, an imaging optics for focusing light reflected on the original, and a light-receiving element for receiving light passing through the imaging optics, the light-receiving element being positioned at a predetermined location on a substrate which is provided with through holes for terminals of lead frames of the rod-shaped light source, characterized in that the terminals of lead frames of the rod-shaped light source are connected with the through holes via a electrical conductor.

(3) An image sensor according to paragraph (1) or (2), wherein a metal thin-walled hood having a slit for passing the light reflected on the original is provided between the original and the imaging optics, the metal hood being accommodated in a housing together with the rod-shaped light source, the imaging optics and the substrate on which the light-receiving element is provided.

(4) An image sensor according to paragraph (3), wherein
positioning holes are formed at the upper portion of the metal hood at both ends in a main scanning direction and at the corresponding portion of the housing, and then positioning pins are inserted into the positioning holes to fix the metal hood and housing, compression coils are provided to press the housing to the original plate via the positioning pins, and a pair of protrusions are provided on both sides of the housing in a main-scanning direction and notched paths are formed at both sides of a base frame accommodating the housing.

(5) An image sensor according to paragraph (3), wherein both corner portions of the metal hood are chamfered.

(6) An image sensor according to any one of paragraphs (3) to (5), wherein a bent portion is provided to the metal hood along a longitudinal direction of the slit to increase the strength of the metal hood.

(7) An image sensor according to any one of paragraphs (3) to (6), wherein the slit is opened by punching out the metal hood from the incident side of light.

(8) An image sensor according to any one of paragraphs (3) to (7), wherein one of the metal hood and housing is provided with positioning protrusions, and the other thereof is provided with positioning holes or recesses to be fitted to the positioning protrusions.

(9) An image sensor according to paragraph (8), wherein the length of the positioning hole or recesses in a longitudinal direction of the slit is longer than that of the positioning protrusion.

(10) An image sensor according to any one of paragraphs (3) to (7), wherein the rod-shaped light source is arranged on both sides of the imaging optics, respectively.

(11) An image sensor according to paragraph (10), wherein the metal hood is a cap-shaped one, and one of the metal hood and housing is provided with positioning protrusions, and the other thereof is provided with positioning holes or recesses to be fitted to the positioning protrusions.

(12) An image sensor according to any one of paragraphs (3) to (11), wherein a blackening coating is executed on the front surface of the metal hood, and a blackening coating or blackening chemical conversion is executed on the rear surface of the metal hood.

(13) An image sensor according to paragraph (12), wherein a reflectance In/Io (1/sr) is 0.6 or less in case of a reflection angle $\theta=0°$, and the reflectance In/Io is 0.3 or less in case of the reflection angle $\theta=50°$.

(14) An image sensor according to paragraph (12), wherein a transparent film is provided to cover the slit for preventing foreign material from invading into the metal hood.

(15) An image sensor according to any one of paragraphs (4) to (14), wherein the notched path is formed so as to be a composite path composed of a curbed path and vertical path, and the upper portion of the vertical path is provided with an evacuation area for the upper one of a pair of protrusions.

(16) An image reading device comprising an image sensor according to any one of paragraphs (1) to (15).

Advantageous Effects of the Present Invention

Advantageous effects of the present invention are as follows.

1. The terminals of lead frames of the rod-shaped light source are bent toward the center of the substrate to be connected to through holes of a substrate, so that the width of a substrate may reduced, a device may be compactified, and the cost may be reduced.

2. The terminals of lead frames of the rod-shaped light source are connected to the through holes via electrical conductors, so that the positioning adjustment of parts becomes easy in addition to the reduction of the substrate width.

3. A thin metal plate is used as a material of a hood provided with a slit (hereinafter referred to as a slit hood), so that the wall thickness of the slit hood may be thin. As a result, the light from a light source is hard to be interrupted compared with a slit hood made of resin, etc. Also, the hood is made of metal, so that the strength for retaining its own shape becomes high, resulting in the improvement of a light-receiving accuracy. The effect is further increased by providing a bent portion along the longitudinal direction of the hood. Furthermore, the corner portion of the slit hood is chamfered, so that the light from the light source is hard to be interrupted, even if the light source is approached to an original.

4. The slit is opened by punching out the hood, so that a trapezoidal cross-sectional shape of the slit may be realized. As a result, an irregular reflection at a slit opening may be prevented.

In a case that a rod-shaped light source is arranged on one side of the imaging optics, the positioning holes opened in the slit hood and the positioning protrusions provided on the housing are fitted, so that the slit hood may be easily and accurately mounted on the housing. In this case, the length in a longitudinal direction of the slit of the positioning holes is longer than that of the positioning protrusions, so that the difference between the coefficients of thermal expansion of the metal hood and resin housing is absorbed, resulting in the improvement of accuracy.

In a case that the rod-shaped light sources are arranged on both sides of the imaging optics, the shape of the slit hood is a cap-shape, one of the hood and housing is provided with positioning protrusions, and the other thereof is provided with positioning recesses. The slit hood may be accurately mounted on the housing by fitting the positioning protrusions and positioning recesses.

5. The slit hood and housing are provided with positioning holes, respectively, and the positioning pins are inserted into the positioning holes to fix the slit hood and housing, so that the positional accuracy of the slit with respect to an optical axis may be improved.

The advantageous effect may be further increased in a case that the rod-shaped light sources are arranged on both sides of the imaging optics, the shape of the slit hood is a cap-shape, one of the hood and housing is provided with positioning protrusions, and the other thereof is provided with positioning holes or recesses, the positioning protrusions and the positioning holes or recesses being fitted.

6. When the hood and housing are fixed by the positioning pins, the positioning pins are provided at the upper portions on both ends in a main scanning direction of the slit hood and housing, the height of the positioning pin protruding from the upper surface of the hood is constant, and a compression coil is provided to press the slit hood to an original glass plate. As a result, the accuracy of the distance between the optical optics and original glass plate may be extremely improved.

7. When a housing including a reading optics is mounted on a base frame, the structure such that the housing is hard to be dropped off from the base frame is adopted. As a result, an image sensor may easily be carried and treated.

Figure 1:
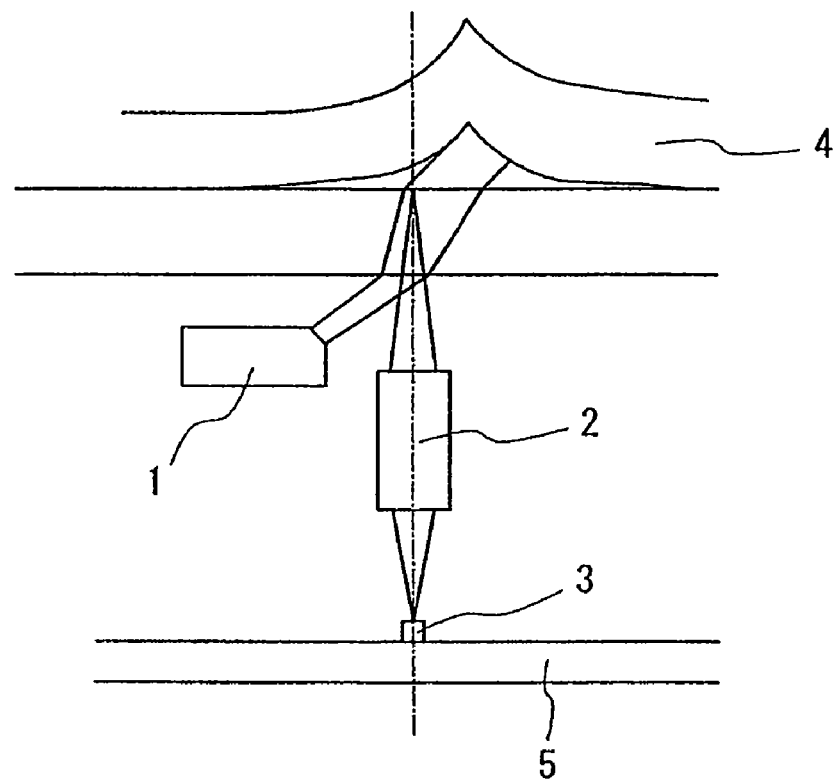
FIG. 1 is a schematic view of a general image sensor.
Figure 2:
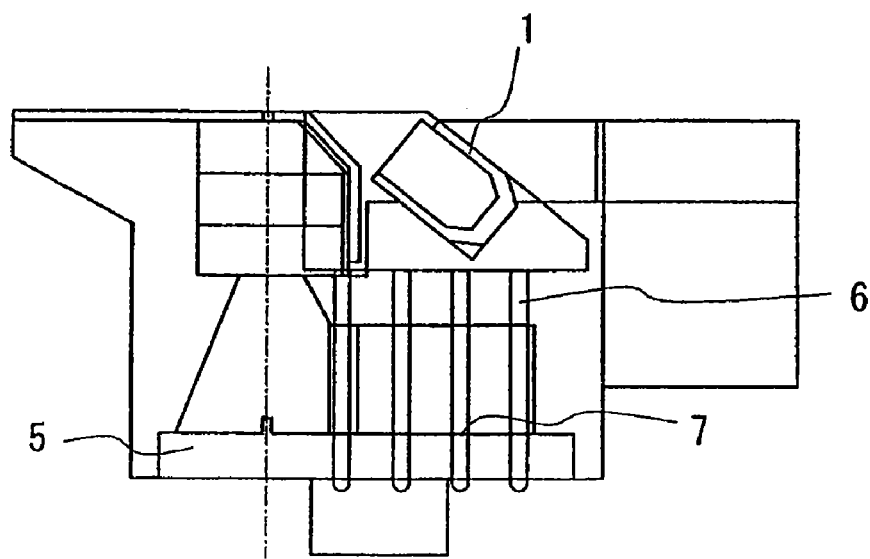
FIG. 2 is a schematic view of an image sensor using a rod-shaped light source.

DESCRIPTION OF REFERENCE NUMERALS 1 rod-shaped light source
2 imaging optics
3 light-receiving element
4 image to be read (original)
5 substrate
6 lead frame
7 through hole
8 electrical conductor
101 rod-shaped light source
102 imaging optics(planar lens array)
103 light-receiving element(line image sensor)
104 image to be read (original)
105 substrate
106 slit
107 slit hood
108 original glass plate
109 housing
110 chamfered portion
111 bent portion
112 punch
113 die
114 positioning protrusion
115 positioning hole
206 slit
207 slit hood
209 housing
212 transparent protective film
214 positioning hole opened in metal hood
216 positioning hole opened in housing
217 compression spring
218 protrusion
219 base frame
220 notched path

BEST MODE FOR CARRYING OUT THE INVENTION

The present invention will now be described in detail.

(A) First, the compactifying of an image sensor substrate is explained.

Figure 5:
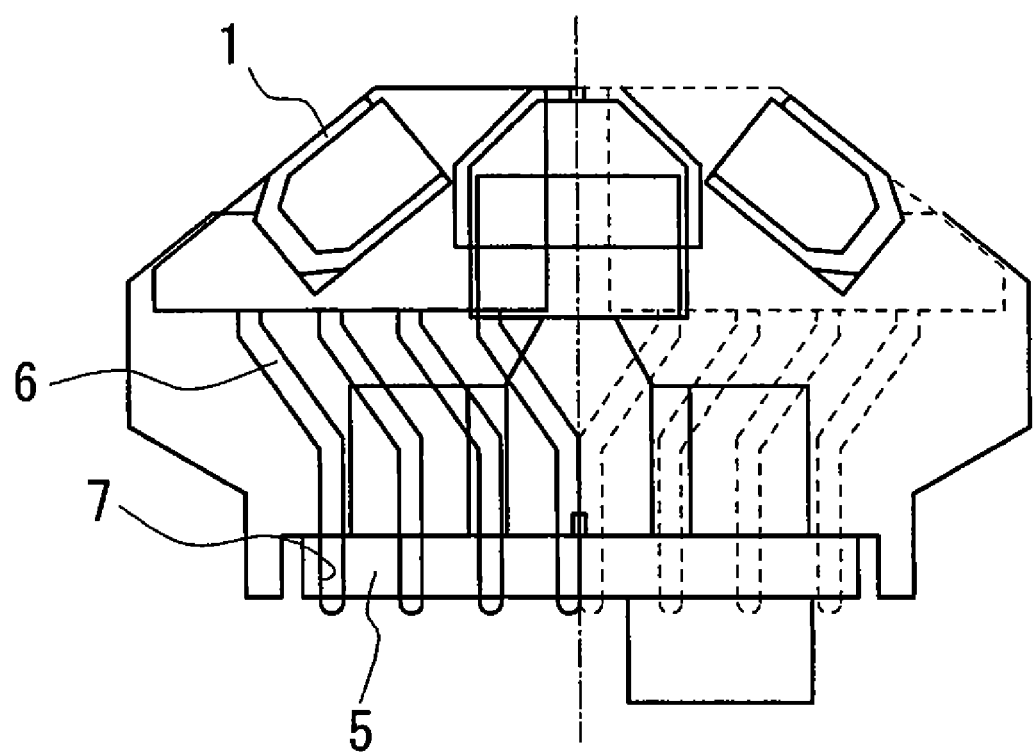
FIG. 5 is a schematic view of an image sensor in which the terminals of lead frames of a rod-shaped light source are bent toward the center of a substrate in accordance with the present invention in an image sensor comprising a rod-shaped light source provided on both sides of a resin lens plate, respectively.

In this case, the terminal shape of lead frames 6 of a rod-shaped light source 1 is deformed as shown in FIG. 5. The terminals of lead frames 6 of a rod-shaped light source 1 are bent toward the center of a substrate (the center line) so that the positions of respective through holes 7 in the substrate 5 are shifted toward the center of the substrate.

Figure 3:
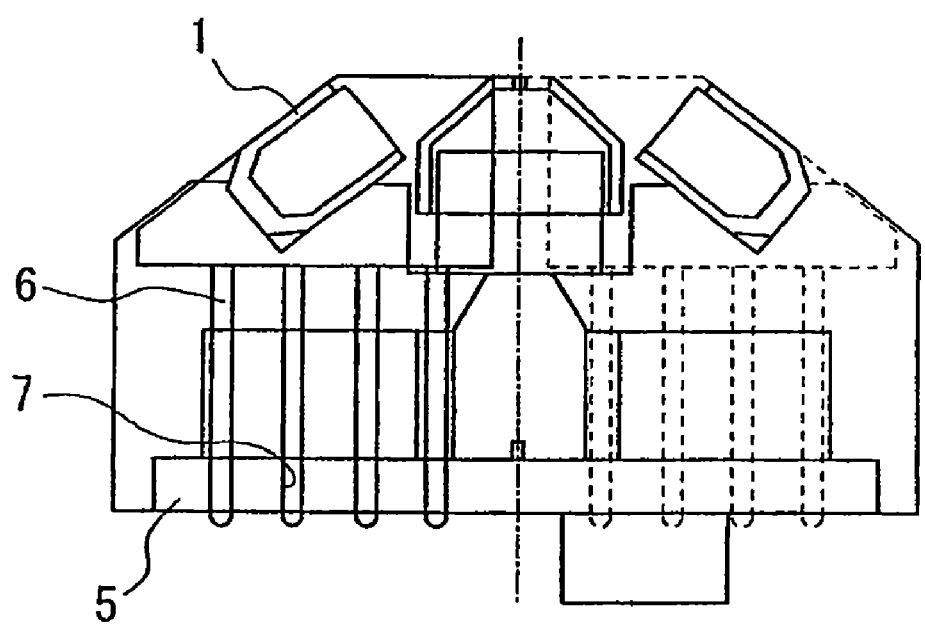
FIG. 3 is a schematic view of an image sensor comprising a rod-shaped light source provided on both sides of a resin lens plate, respectively.

According to the structure described above, the width of the substrate may be decreased as apparent from the comparison with the structure in FIG. 3.

While a rod-shaped light sources is positioned on both sides of a resin lens plate, respectively, the present invention is not limited thereto. The same advantageous effect may be obtained in a case that a rod-shaped light source is positioned on one side of the resin lens plate.

Figure 6:
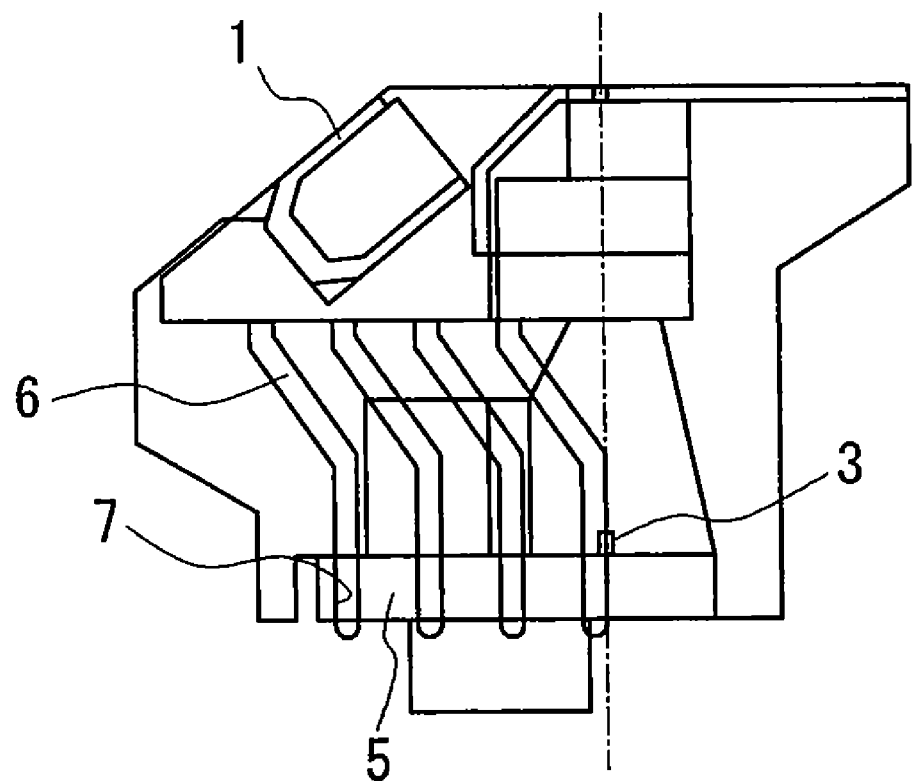
FIG. 6 is a schematic view of an image sensor in which the terminals of lead frames of a rod-shaped light source are bent toward the center of a substrate in accordance with the present invention in an image sensor comprising a rod-shaped light source provided on one side of a resin lens plate.

In a case that a rod-shaped light source is positioned on one side of the resin lens plate as shown in FIG. 6, the terminals of lead frames 6 of a rod-shaped light source 1 is bent toward the light-receiving element so that the positions of respective through holes 7 in the substrate 5 are shifted toward the center of the substrate, resulting in the decreasing of a substrate width.

Figure 7:
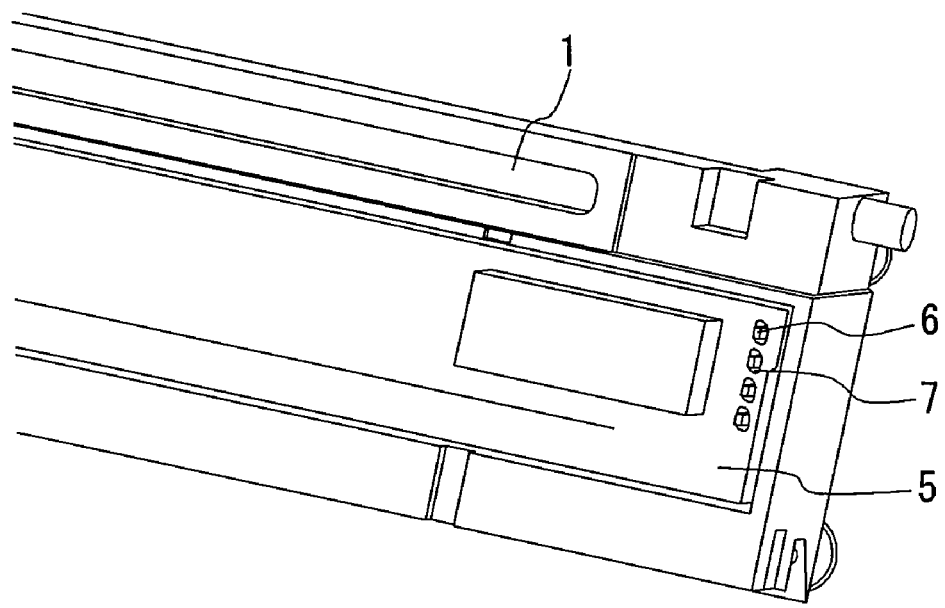
FIG. 7 is a perspective view illustrating the back side of a conventional contact image sensor.

Referring to FIG. 7, there is shown the back side of a conventional contact image sensor in a perspective view. A terminal of a lead frame 6 is inserted into a through hole 7 of a substrate 5 as shown in the figure and is soldered to the through hole 6 to implement an electrical connection therebetween.

Figure 8:
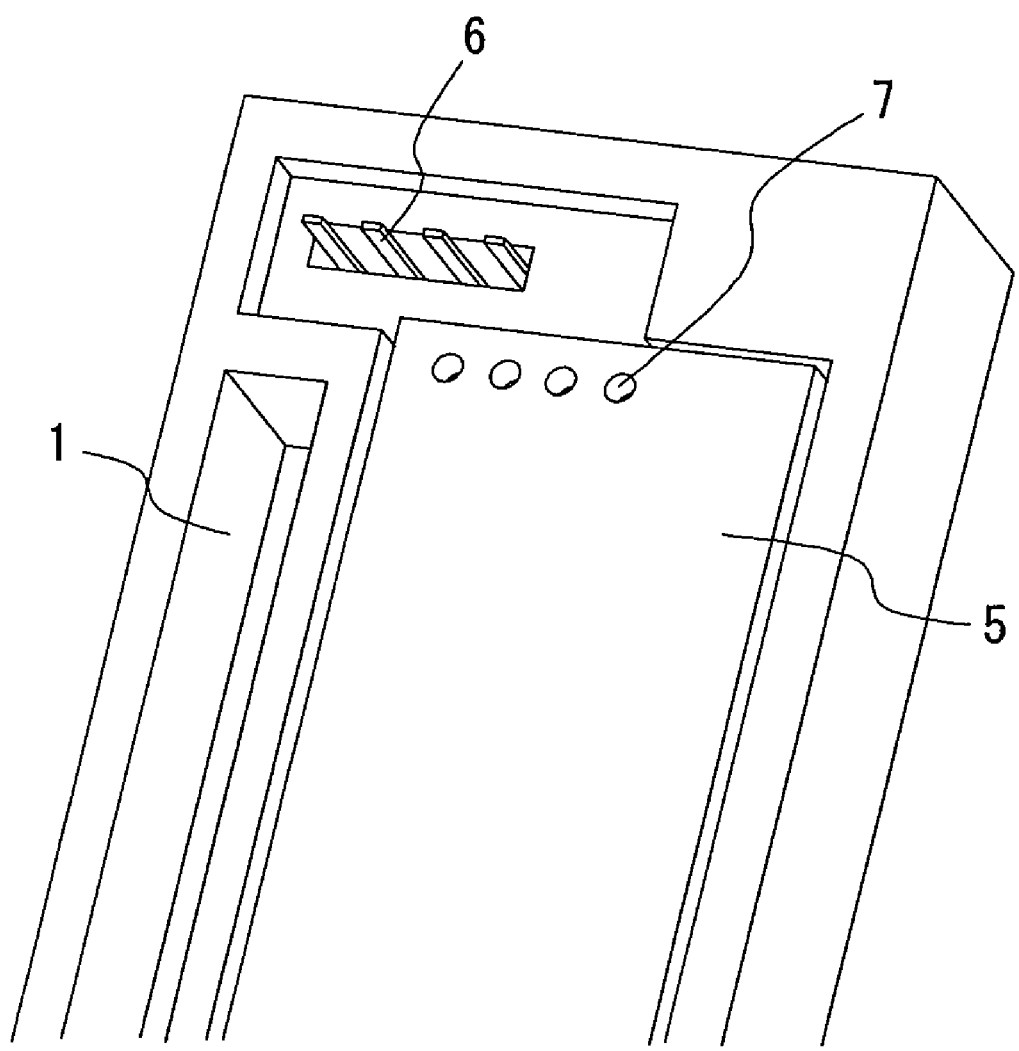
FIG. 8 is a perspective view illustrating the structure in which the width of the substrate is shorter than that of the terminal area of the lead frames in accordance with the present invention.
Figure 9:
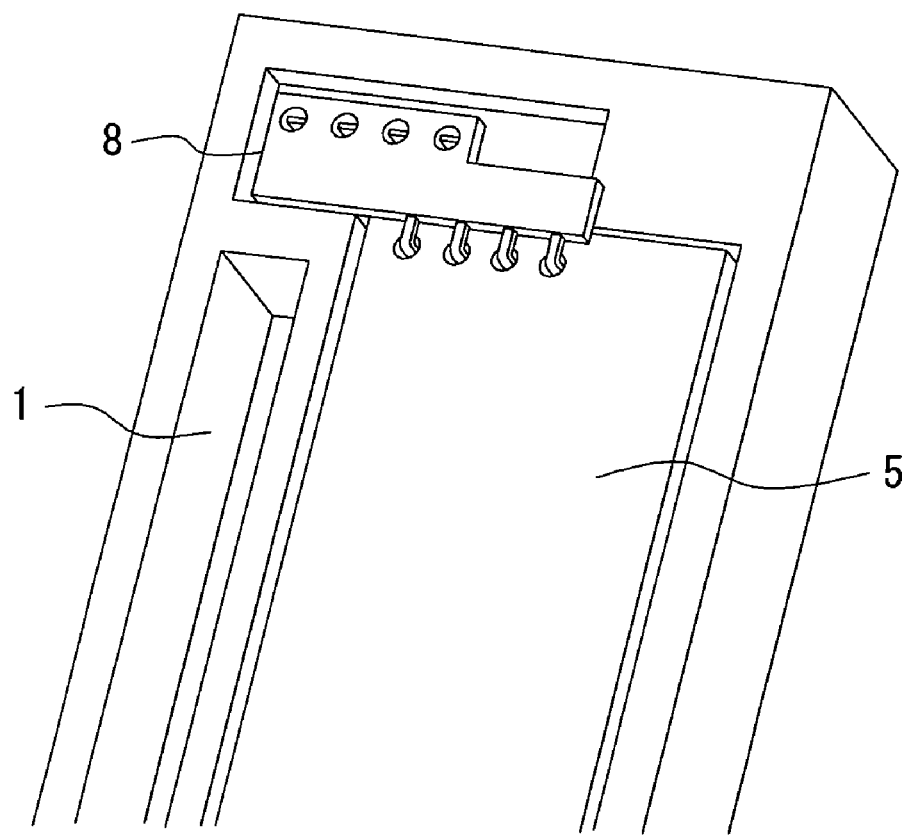
FIG. 9 is a perspective view illustrating the structure in which the through hole and lead terminal are connected via a flexible printed-circuit board in accordance with the present invention.

On the contrary, according to the present invention, the width of the substrate 5 is shorter than that of the terminal area of the lead frames 6 as shown in FIG. 8, and the electrical connection between the through hole 7 and the lead terminal is realized via an electrical conductor 8 as shown in FIG. 9. Herein, a flexible printed-circuit board is preferable as the electrical conductor 8, but a lead wire etc. may be also preferable.

In this manner, the width of the substrate may be suitably selected without being restricted by the terminal position of lead frames.

Figure 10:
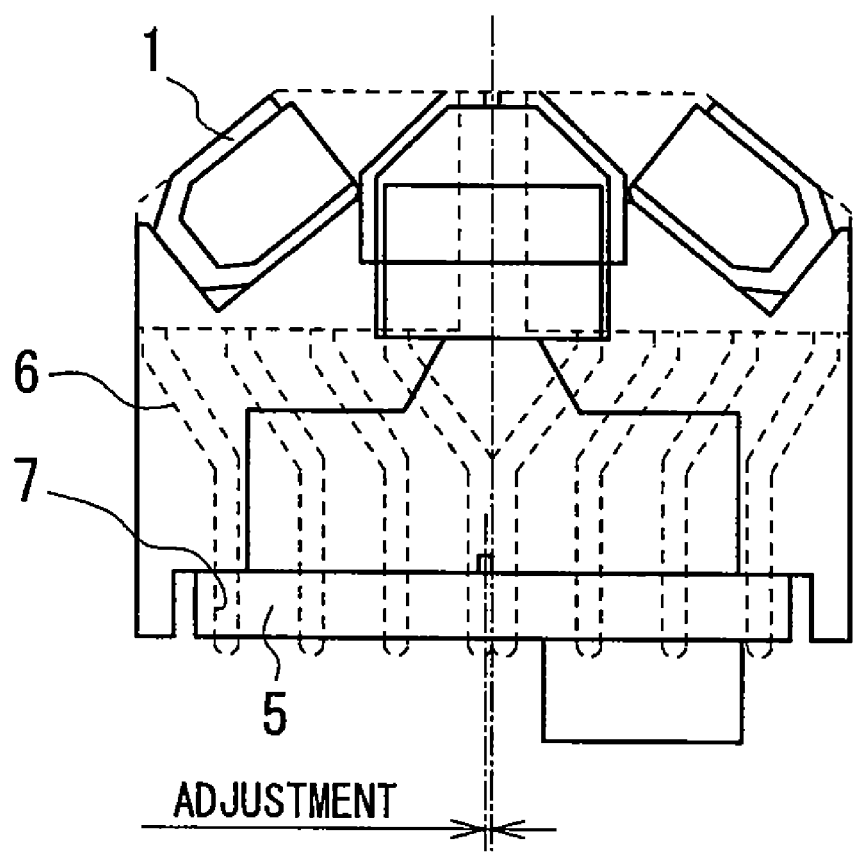
FIG. 10 is a schematic view illustrating the adjustment of an optical axis.

In the optics in which a slit is provided, an extremely accuracy is required in positioning of a slit opening and a sensor in a sub-scanning direction. Accordingly, in a contact image sensor, it is required that an optical axis is adjusted by shifting the substrate with respect to the housing after assembling as shown in FIG. 10 in order to adjust the positional relationship between the slit opening and the sensor.

Due to this adjustment, the positional relationship between the terminals of lead frames of the rod-shaped light source and the through holes opened in the substrate is varied. Therefore, there is a risk such that the terminal of a read frame may not enter into the through hole in a conventional structure.

In a case that the electrical connection between the terminal of the lead frame and the through hole is implemented by a separate member in accordance with the present invention, the handling for the above-described optical axis adjustment may be possible.

As materials for the housing and substrate, it is preferable that materials each coefficient of thermal expansion thereof are substantially the same are used. As a result, the degradation in a positional accuracy due to the alteration of circumference, particularly temperature may be effectively prevented.

In addition, the color of the surface of a substrate and the bonding material of the substrate is preferably black to effectively prevent the generation of stray light.

It is preferable that the position of a light-receiving element is determined to be at the center of the substrate, because when the light-receiving element is positioned near to the side edge of the substrate, a bimetal phenomenon between the substrate and light-receiving element is caused by annealing processing during bonding the light-receiving element to the substrate to generate a warpage of the substrate, resulting in the degradation of a positional accuracy. On the contrary, when the light-receiving element is positioned at the center of the substrate, there is no risk of warpage of the substrate, resulting in the improvement of the mounting accuracy.

(B) Subsequently, the method for preventing ghost and stray light from generating in an imaging optics mounted on a unit for a writing optics of a light printer etc. or a reading optics of a scanner etc. will now be described.

Figure 4:
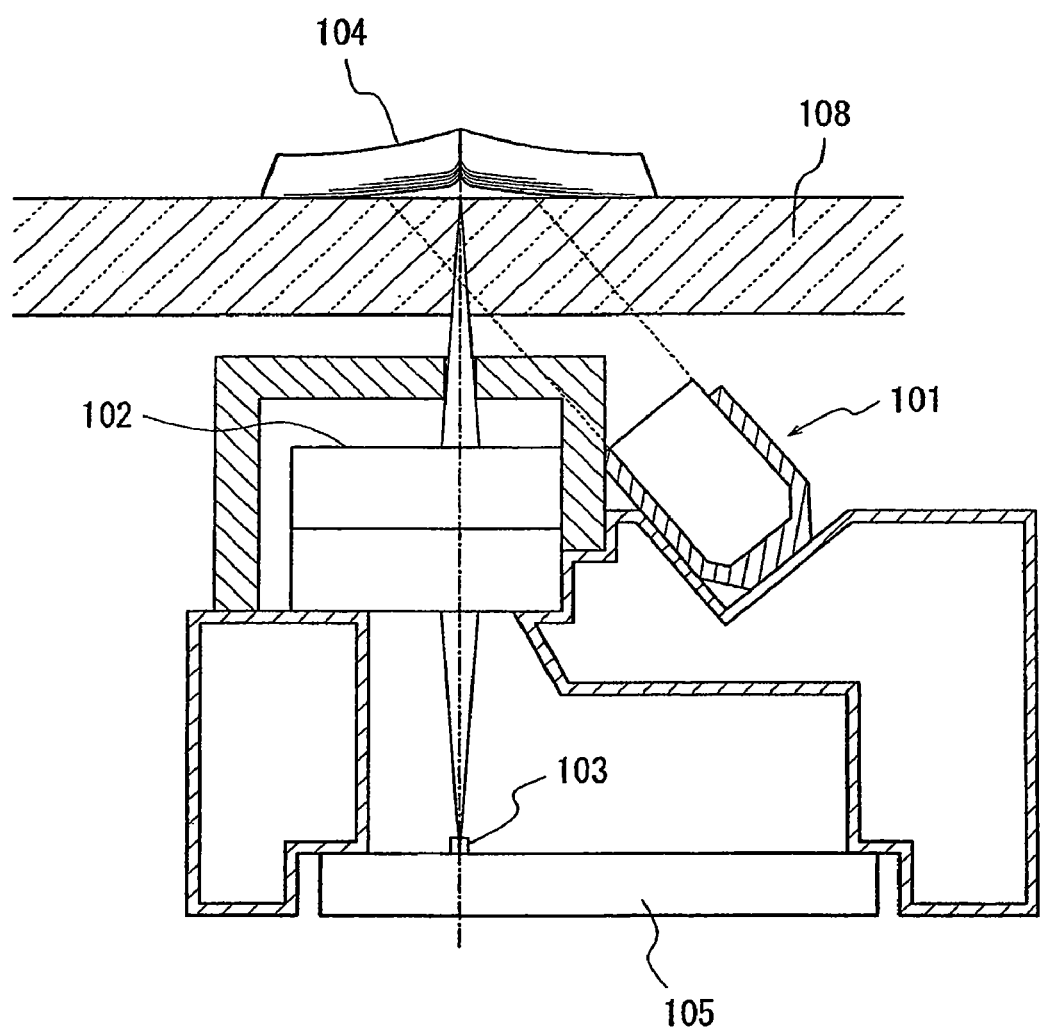
FIG. 4 is a cross-sectional view of a conventional contact image sensor.
Figure 11:
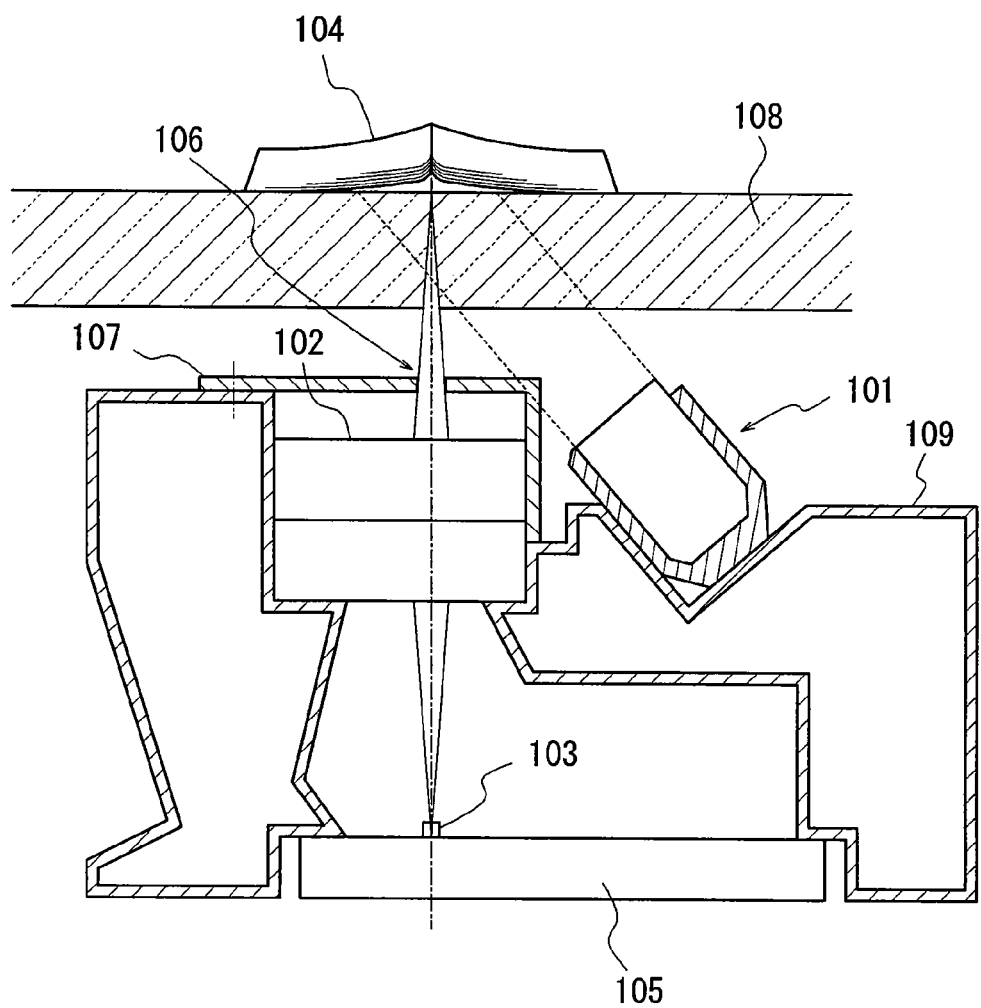
FIG. 11 is a cross-sectional view of a preferable contact image sensor in accordance with the present invention.

Referring to FIG. 11, there is shown a preferable image sensor in accordance with the present invention. In FIG. 11, the same reference numerals as in FIG. 4 are used. Reference numeral 106 designates a slit for passing the light reflected on the original 104, and 107 a metal hood provided with the slit 106. As a metal material for the hood, iron, steel etc. are preferable, but nonferrous metal may also be used so long as it is metal. Reference numeral 108 designates an original glass plate, and 109 a housing.

As shown in the figure, an image sensor in accordance with the present invention comprises, in the housing 109, a rod-shaped light source (an irradiation device) 101 irradiating light on the original 104, the slit hood 107 provided with the slit for passing the light reflected on the original, a planar lens array 102 which is an imaging optics for focusing the light passed via the slit 106, and a substrate 105 including a light-receiving element 103 for receiving the light transmitting the planar lens array 102.

In the figure, the light output from the rod-shaped light source 101 is incident on substantially the same point on the original 104 set on the glass plate 108. While the rod-shaped light source 101 on one side of the planar lens array 102 as shown in the figure, a rod-shaped light sources may be arranged on both sides of the planar lens array, respectively, as described later.

The slit 106 is provided at the position which substantially corresponds to the optical axis. A spacer (not shown) may be inserted between the slit hood 107 and the original glass plate 108 in order to adjust the distance therebetween.

The slit hood 107 is made of metal as described above, so that a substantially thin-walled one may be implemented compared with a conventional slit hood made of resin. Accordingly, if the position of the rod-shaped light source 101 is the same as in the conventional image sensor (in FIG. 4), then the percentage of irradiating light interrupted by the slit hood 107 is substantially decreased. As a result, the image quality may be improved.

As apparent from FIG. 11, when the slit hood is made of metal in accordance with the present invention, the slit hood may be substantially thin-walled compared with a resin-made one. Therefore, the rod-shaped light source 101 may be approached to the optical axis of the sensor by the decreased wall thickness of the slit hood 107.

However, in a case that the rod-shaped light source 101 is only approached to the optical axis of the sensor, a part of irradiating light is interrupted by the slit hood 107, so that the amount of irradiating light is decreased by the interrupted light.

Figure 12:
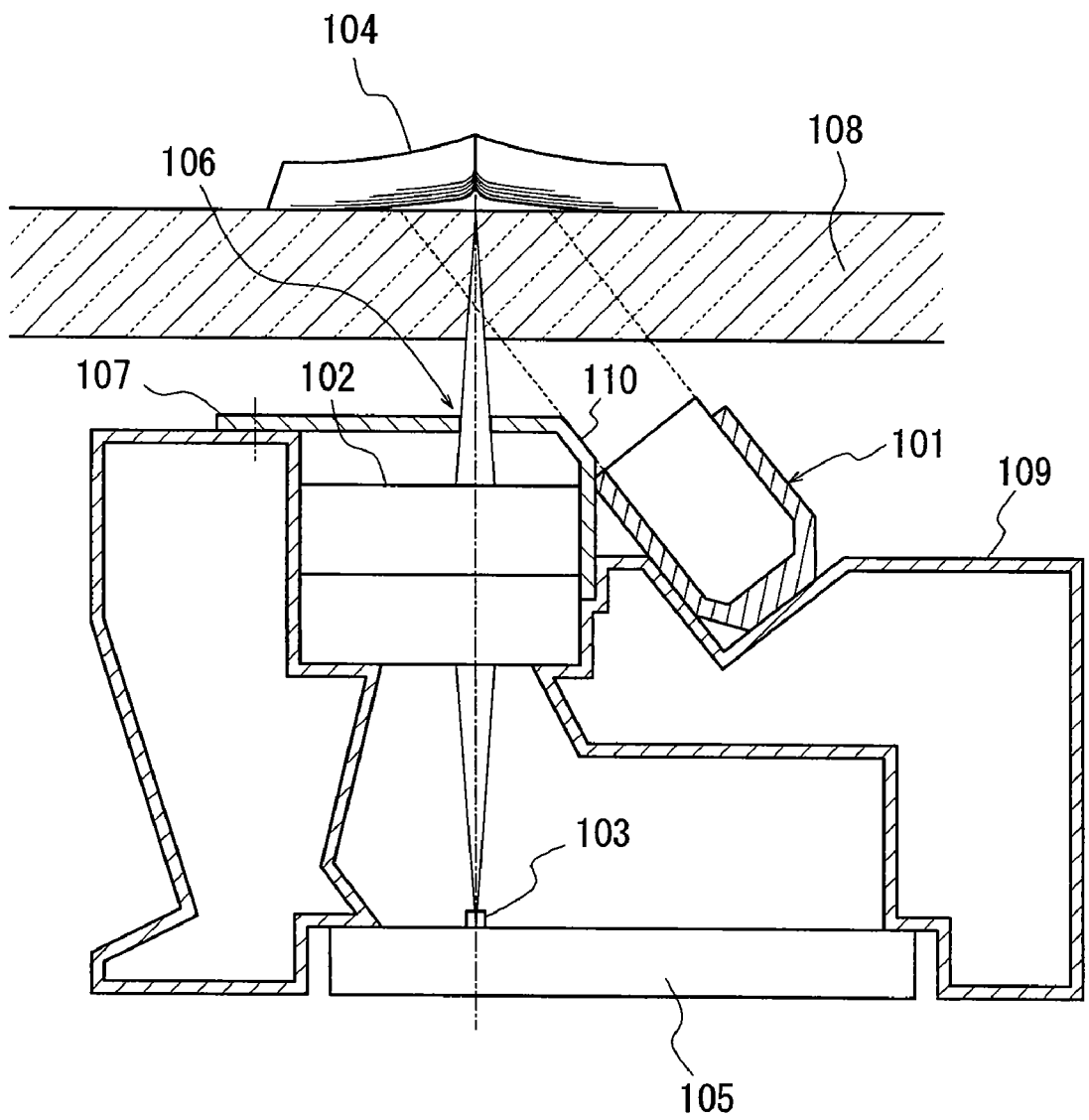
FIG. 12 is a cross-sectional view of a preferable contact image sensor in accordance with the present invention in which the corner of the slit hood on the side of the rod-shaped light source is chamfered.

According to the present invention, the corner of the hood 107 on the side of the rod-shaped light source 101 is chamfered as shown in FIG. 12, so that the irradiating light is not interrupted by the slit hood 107.

According to the structure described above, the optical path of the optical source may be ensured, so that all of the irradiating light may proceed to the original 104 without being interrupted by the slit hood 107, resulting in the substantial increase of the amount of light on the original. In the figure, reference numeral 110 designates the chamfered portion.

Also, according to the present invention, a bent portion may be provided to the slit hood along the longitudinal direction of the slit in order to increase the strength of the slit hood 107, and the opening accuracy and linear accuracy, i.e., the light-receiving accuracy of the slit along the longitudinal direction of the lens array.

Figure 13:
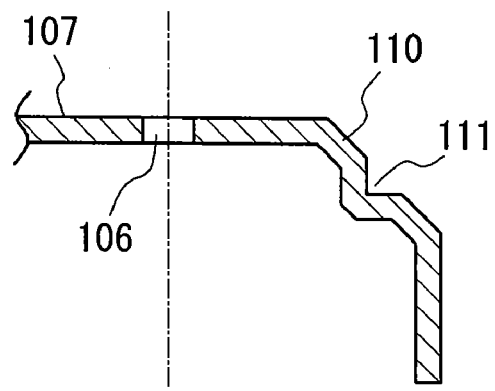
FIG. 13 is a cross-sectional view showing the bent portion formed at the chamfered portion of the slit hood.

It is preferable that the bent portion is formed at the chamfered portion 110 at the corner of the slit hood 107 on the side of the rod-shaped light source as shown in FIG. 13 so as not to disturb the optical path as well as the incident light path. In the figure, reference numeral 111 designates the bent portion.

In the present invention, the mounting angle of the irradiation device (the rod-shaped light source), on condition that the mounting angle is 0° when the original glass plate and the output surface of the irradiation device are parallel, is preferably larger than 0° and is smaller than 45° or less. If the mounting angle is 0°, then the irradiating light is totally reflected on the original glass plate. If the angle is larger than 45°, then not only the height dimension of the image sensor becomes larger, but also the light distribution characteristic is degraded.

As an irradiation device, a device is preferable in which a rod-shaped light guide made of a transparent resin is accommodated within a white resin case made of acryl, for example. A light-emitting unit is attached to at least one end of the resin case. Light from the rod-shaped light guide is totally reflected in the rod-shaped light guide and is output from the output surface thereof to irradiate the original.

As a planar lens array, a resin elected lens array is preferable in which at least two resin lens plate (a plurality of spherical or aspherical microlens arranged regularly in a predetermined pitch on a resin plate) are overlapped so that the optical axes of respective microlens of respective lens plate are correspondent to each other.

Such a resin lens plate may be preferably fabricated by an injection mold. A resin lens plate fabricated by an injection mold has a long rectangular shape. In the lens forming area of the resin lens plate, a plurality of spherical or aspherical microlens are arranged regularly in a longitudinal direction of the plate (corresponding to a main-scanning direction of the image sensor) and plural rows of spherical or aspherical microlens are arranged in a direction perpendicular to the longitudinal direction (a sub-scanning direction).

Such a resin lens plate has a comparatively large focal depth, so that the fuzziness of a reading image due to the degradation of illuminance on the original based on a space caused between the original and the original glass plate, and due to the out-of-focus of a lens is hard to be generated, and there is a benefit such that the quality of reading image is superior.

The lens plate is accommodated in a housing by fitting undercut portions formed at the circumference of the lens plate to protruding portions formed on the housing. As the circumference of the lens plate is covered by the housing, a part of incident light on the lens plate from the original, which does not contribute to form an image point, and the disturbance light may be shielded. It is preferable that the inner wall of the housing is subjected to a light absorbing processing.

The width of a slit formed in the hood is equal to or smaller than the width of a lens forming area of the lens plate in a sub-scanning direction. The slit hood may be made of metal, but preferably may be made of steel of high hardness.

Figure 14:
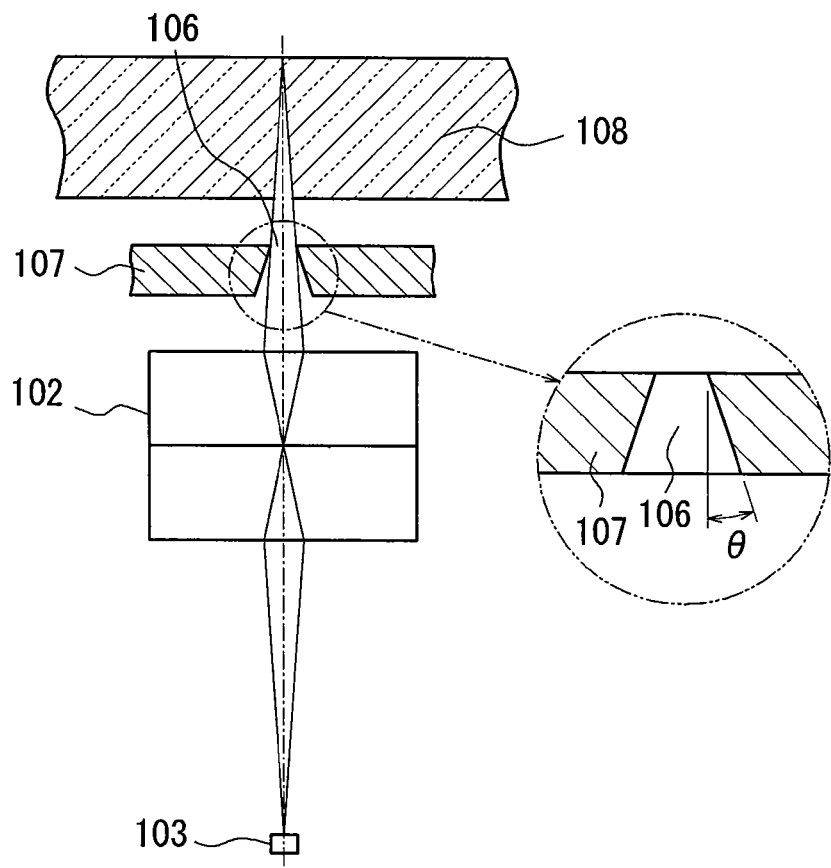
FIG. 14 is a cross-sectional view showing the cross-sectional shape of a preferable slit in accordance with the present invention.
Figure 15:
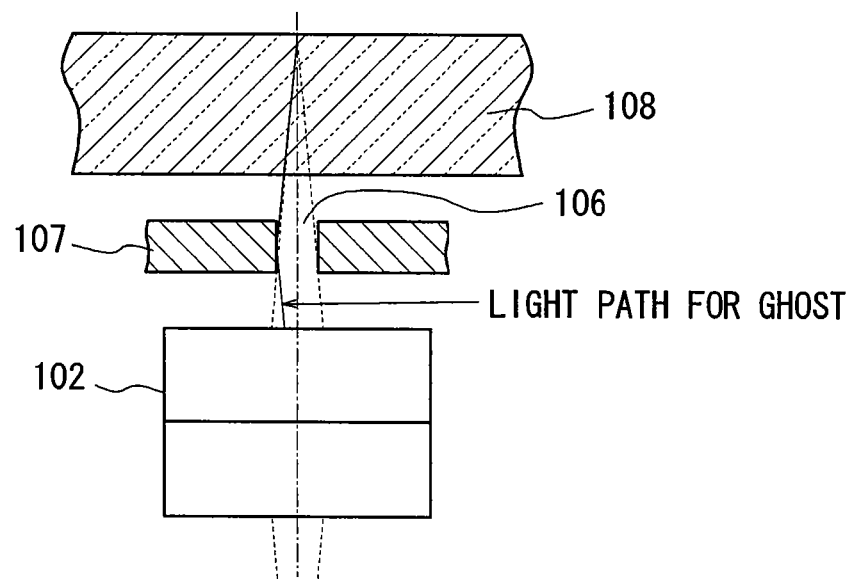
FIG. 15 is a cross-sectional view showing the cross-sectional shape of a conventional slit.

The cross-sectional shape of the slit is preferably trapezoid so that the opening area on the incident side (the side on which the reflected light from the original is incident) is smaller than that on the side of the lens plate as shown in FIG. 14. It is preferable that the inclined angle θ of the side of the trapezoid is equal to or lager than a view angle of the lens array, because if the inclined angle θ is smaller than the view angle, then the light is reflected on the surface of the side wall of the opening to generate ghost as shown in FIG. 15.

Herein, the view angle is an angle defined below. The light output from one point on the original is incident on any microlens of the stacked lens arrays, and then on the image element of the light sensor array corresponding to said one point on the original. The angle of light ray inclined most from the optical axis of microlens is referred to as a view angle, the light ray being incident on the light sensor array.

Figure 16:
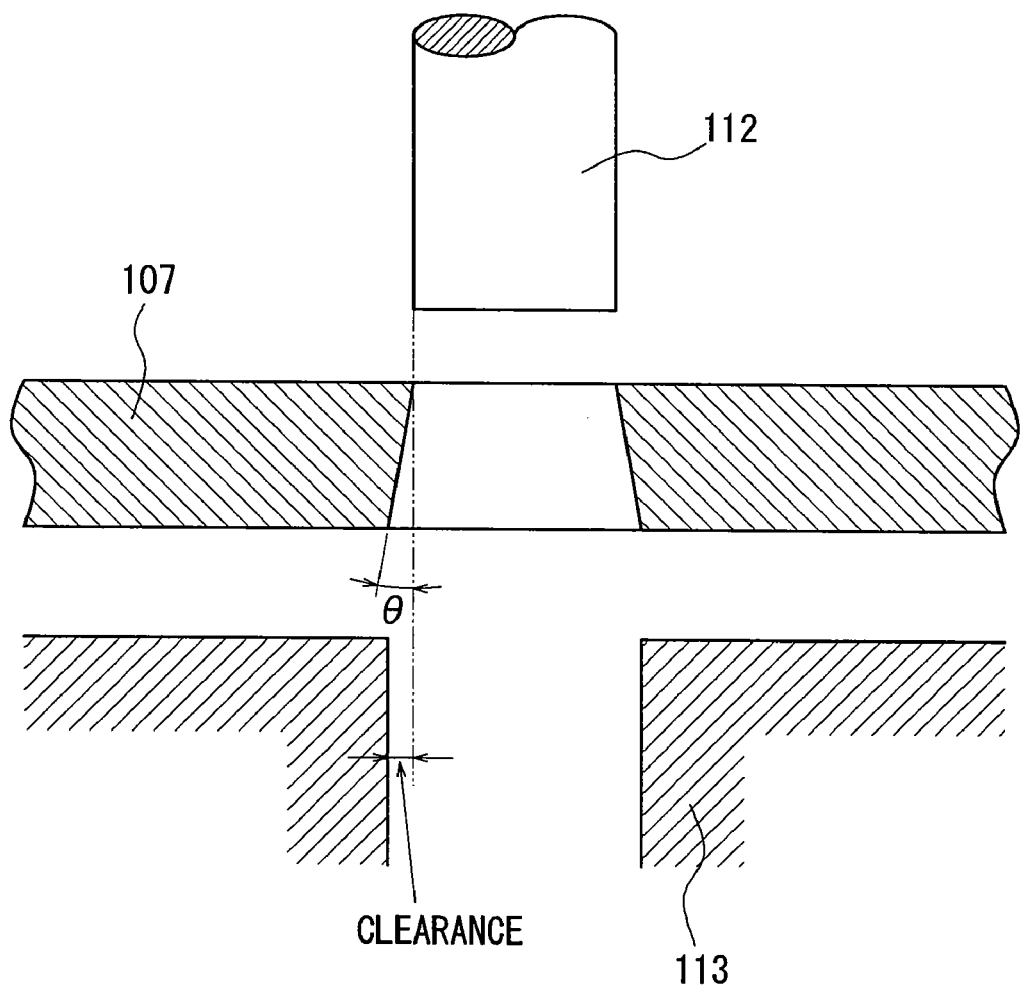
FIG. 16 is cross-sectional view illustrating a punching for the slit having a trapezoidal cross-sectional shape.

The slit having such a trapezoidal cross-sectional shape may be fabricated by punching as shown in FIG. 16. In this case, the clearance between the punch 112 and die 113 is set to be largish to punch out the hood from the incident side of light. As s result, the inclined angle θ in the side of the trapezoidal cross-sectional shape of the slit may be adjusted suitably.

Subsequently, the assembling of the slit hood and housing in a case that the rod-shaped light source is arranged on one side of the planar lens array will now be described.

Figure 17:
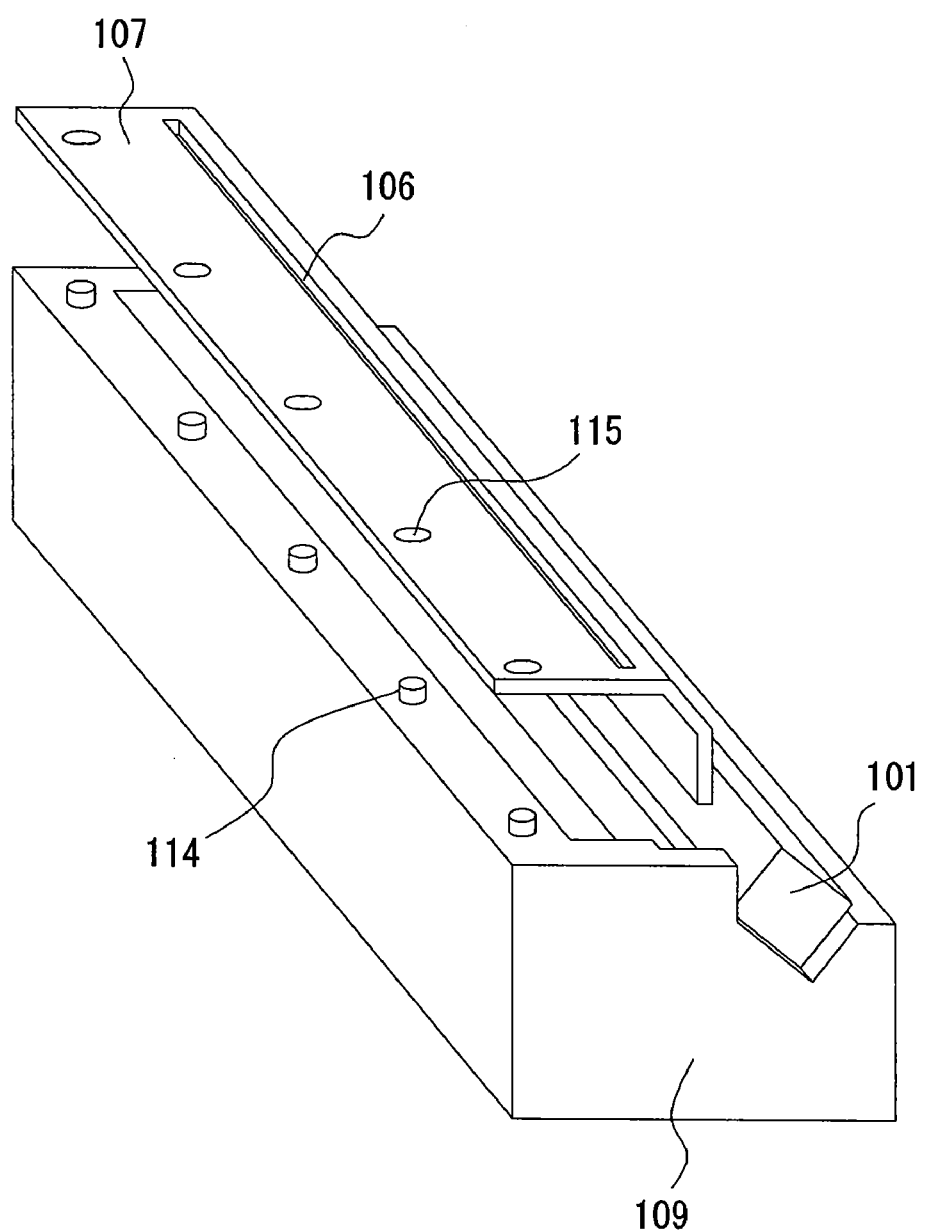
FIG. 17 is a schematic view illustrating the fitting of the slit hood and the housing in an image sensor comprising a rod-shaped light source provided on one side of a planar lens array.

In this case, the assembling is carried out, as shown in FIG. 17 for example, by fitting positioning protrusions provided on the housing 109 to positioning holes 115 opened in the slit hood 107. The shape of the protrusion is convex, but is not limited thereto. The hole 115 may be a through-hole or recess. Alternatively, the housing 109 may be provided with through-holes or recesses, and the slit hood with protrusions.

Figure 18:
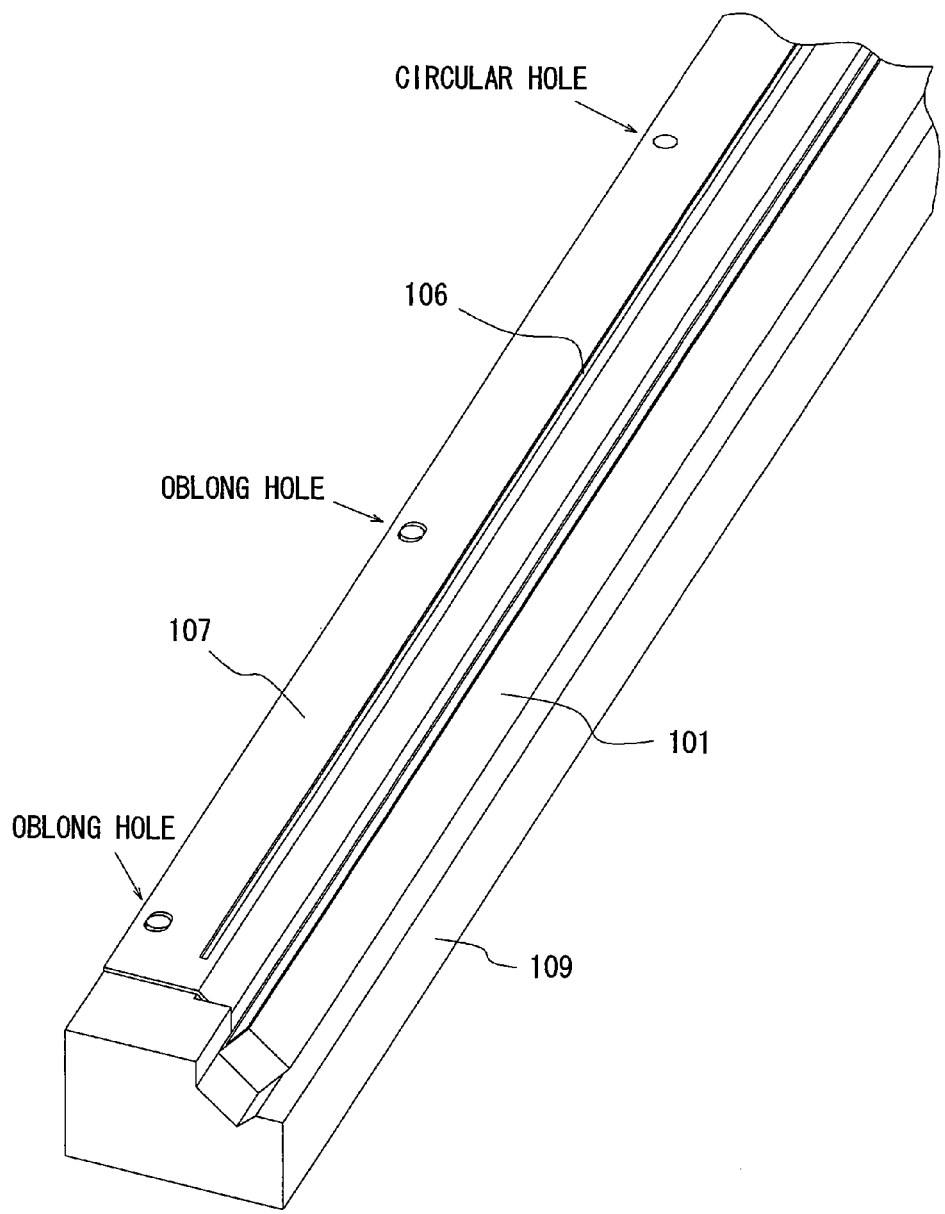
FIG. 18 is a schematic view illustrating the assembling capable of the absorption of the difference between the coefficients of thermal expansion of the slit hood and housing.

It is also preferable that the positioning protrusion is a circular cylinder, and the hole 115 of the slit hood 107 is an oblong hole. The assembling is possible by providing one hole at each end of the hood, respectively, i.e., two holes in total. However, if both of two holes are oblong holes, the positional accuracy of the slit hood in a longitudinal direction may not be secured. Therefore, when one hole at each end and one hole at the center of the hood, i.e., three holes in total are provided (in FIG. 18, two holes at each end and one hole at the center, i.e., five holes in total are provided), the hole at the center being a circular hole and the holes at the ends being oblong holes, respectively, it is possible that the positional accuracy is be secured at the circular hole and the difference between the coefficient of thermal expansion of the slit hood and that of the housing is absorbed by the oblong holes. In order to absorb the thermal expansion coefficient difference, it is required that the longitudinal dimension of the hole or recess is larger than that of the protrusion. Therefore, the shape of the hole is not limited to oblong, but quadrangle etc. may be selected.

While the slit hood is conductive because it is made of a metal plate, a conductive film may further be formed thereon. When the electric potential of the metal plate or conductive film is adjusted to hold the electric potential thereof equal to that of a photo-sensitive drum, toner may be prevented from being pulled to the slit hood and being attached to the lens plate.

Figure 19:
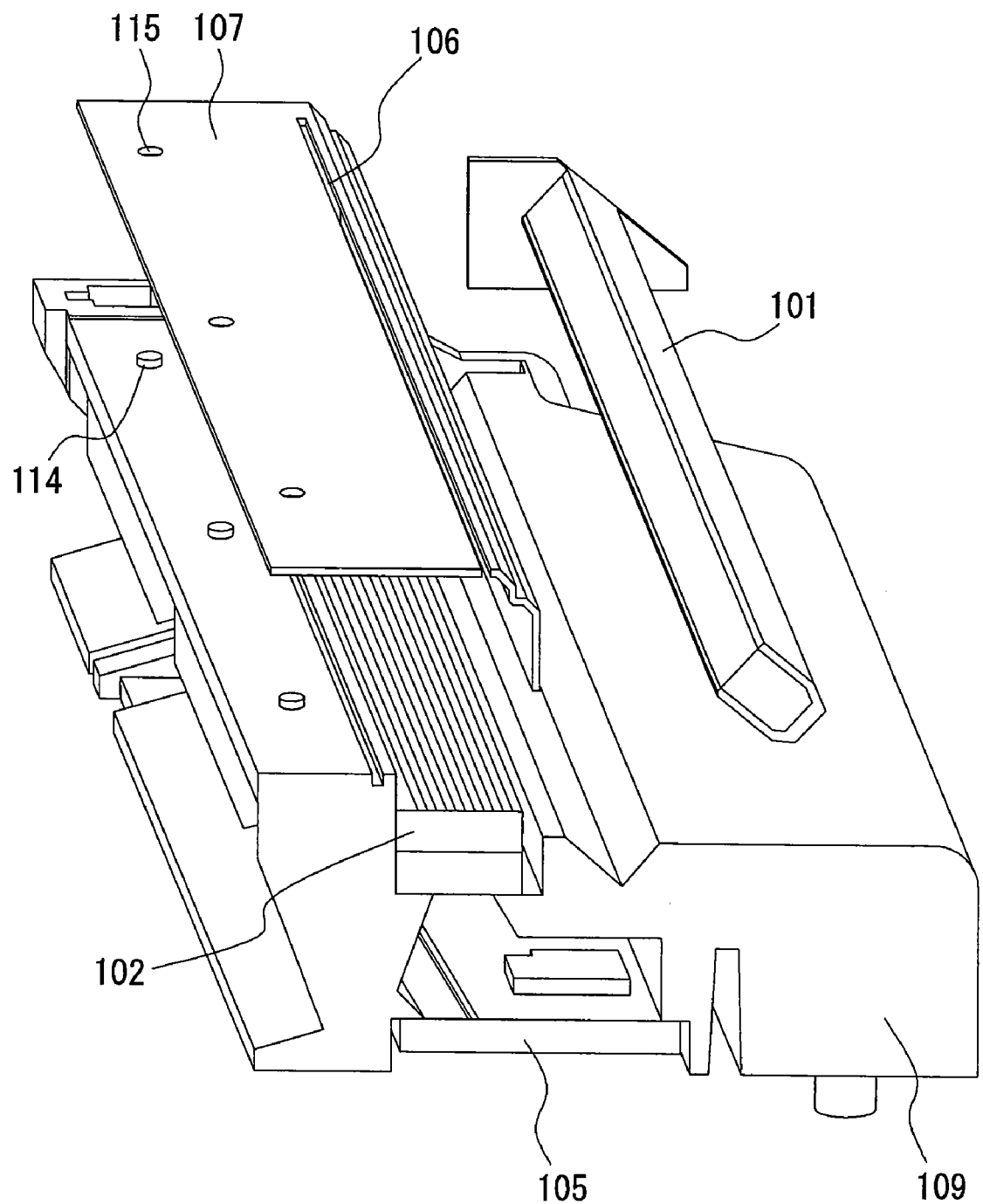
FIG. 19 is an exploded perspective view for illustrating the assembling of the rod-shaped light source, the planar lens array, the substrate on which the light-receiving element is mounted, and the slit hood into the housing.

In FIG. 19, there is shown an exploded perspective view for illustrating the assembling of the rod-shaped light source 101, the planar lens array 102, the substrate 105 on which the light-receiving element 103 is mounted, and the slit hood into the housing 109.

Subsequently, the case in which a rod-shaped light sources is arranged on both sides of a planar microlens array, respectively, will now be described.

Figure 20:
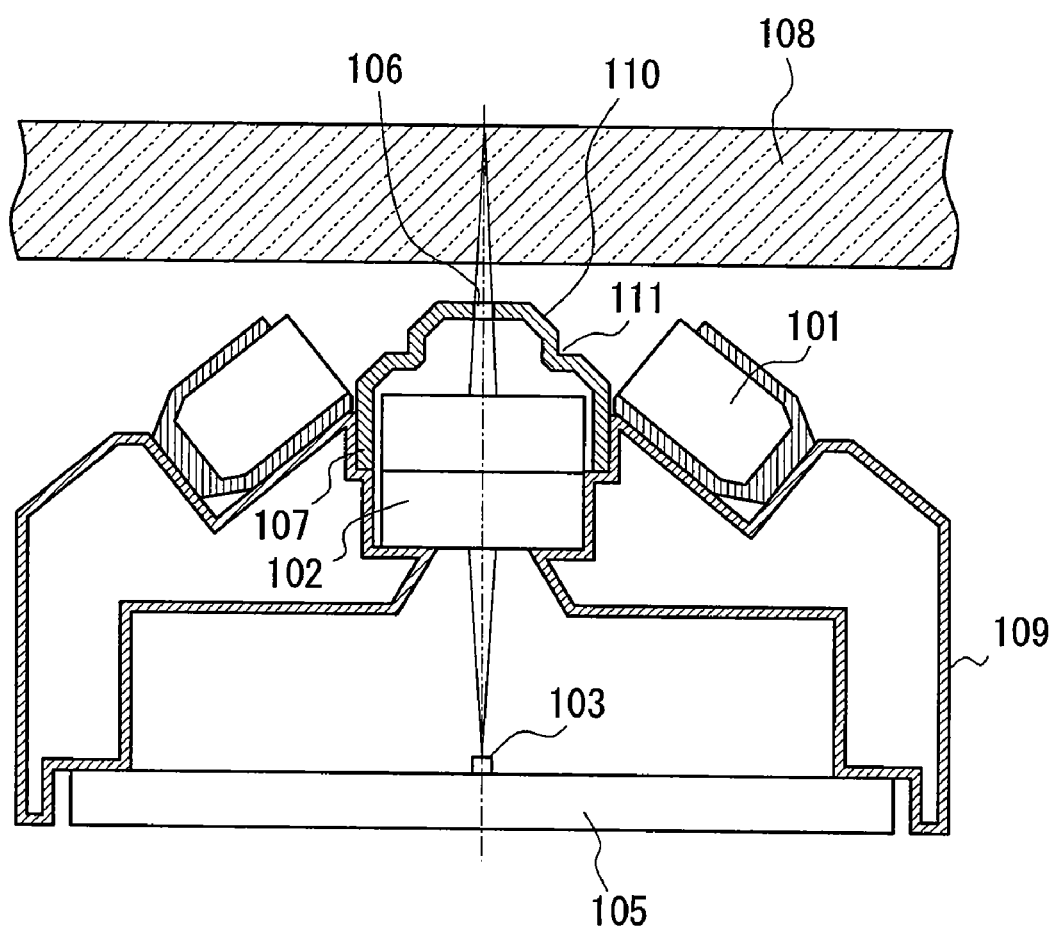
FIG. 20 is a sectional-view of a preferable contact image sensor in accordance with the present invention in a case that a rod-shaped light source is provided on both sides of a planer lens plate, respectively.

In this case, the slit hood is required to be a cap-shaped one, because the rod-shaped light sources are to be arranged on both sides of the planar microlens array. It is preferable that the corners, i.e., the both shoulder portions of the slit hood on the sides of the rod-shaped light sources are chamfered. It is further preferable that the bent portion 111 is formed at the chamfered portion 110 of the slit hood along the longitudinal direction as shown in FIG. 20 to strengthen the slit hood.

Also, in this case, the slit 106 opened in the slit hood 107 is required to be accurately positioned with respect to the optical axis, so that it is desirable that the housing 109 is provided with a step which allow the slit to be aligned in order to improve the accuracy of the position of the slit by fitting the step to the housing.

According to this structure, the light may be irradiated from both sides of the planar lens array, so that the amount of light is doubled in comparison with the case in which the rod-shaped light sources is arranged on one side of the planar lens array.

Figure 21:
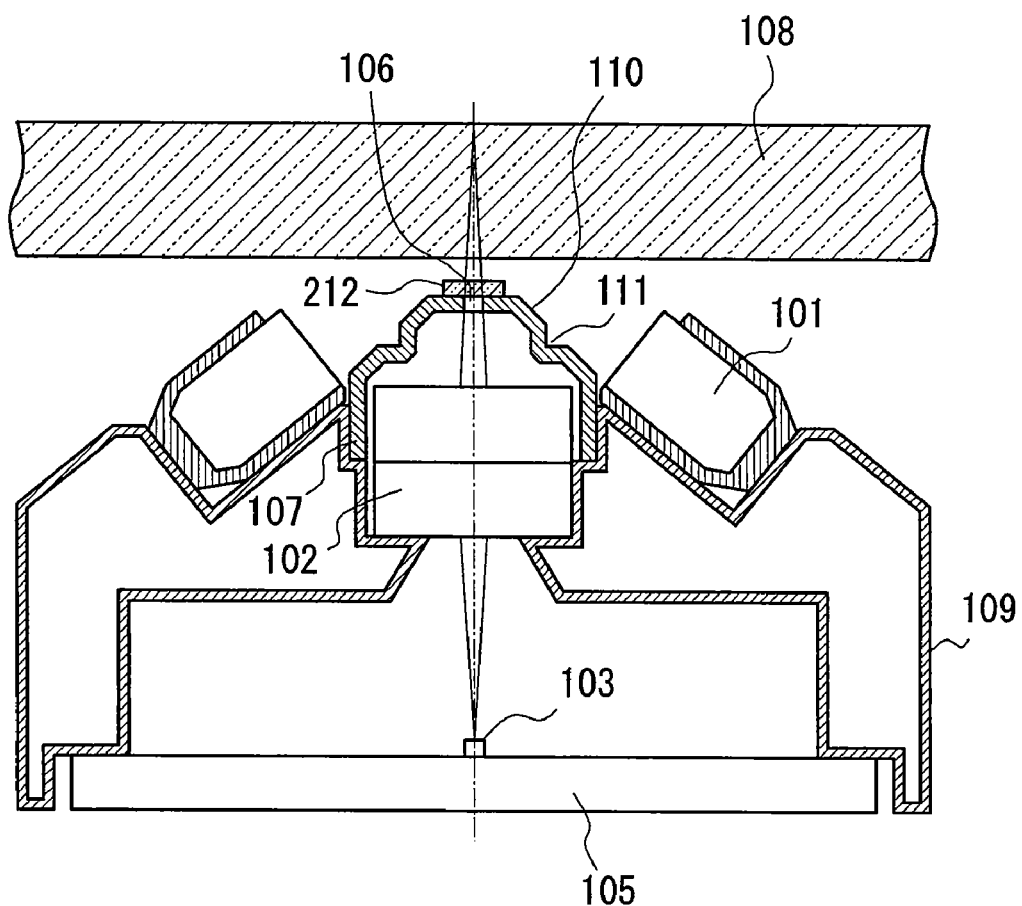
FIG. 21 is a sectional-view of a preferable contact image sensor (including a transparent membrane) in accordance with the present invention in a case that a rod-shaped light source is provided on both sides of a planer lens plate, respectively.

In order to prevent foreign material such as dust from invading into the slit hood, a transparent protective film 212 such as a transparent film may cover the slit as shown in FIG. 21.

Figure 22:
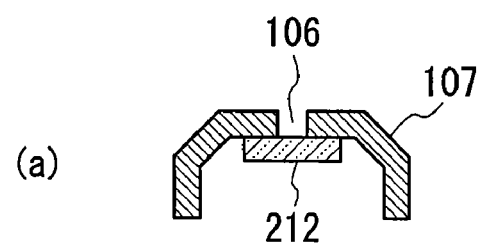
FIG. 22 is cross-sectional view illustrating an attachment of a transparent film.
Figure 22:
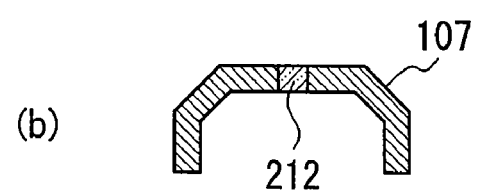

When such a transparent film is attached, the transparent film may be adhered from the outer side of the slit hood as shown in FIG. 21, the transparent film may be adhered from the inner side of the hood as show in FIG. 22(a), or a transparent resin may be directly inserted into the slit as shown in FIG. 22(b)

As a material of the transparent film 212, any material of a high transmittance may be used, in particular an acryl resin is preferable.

Figure 23:
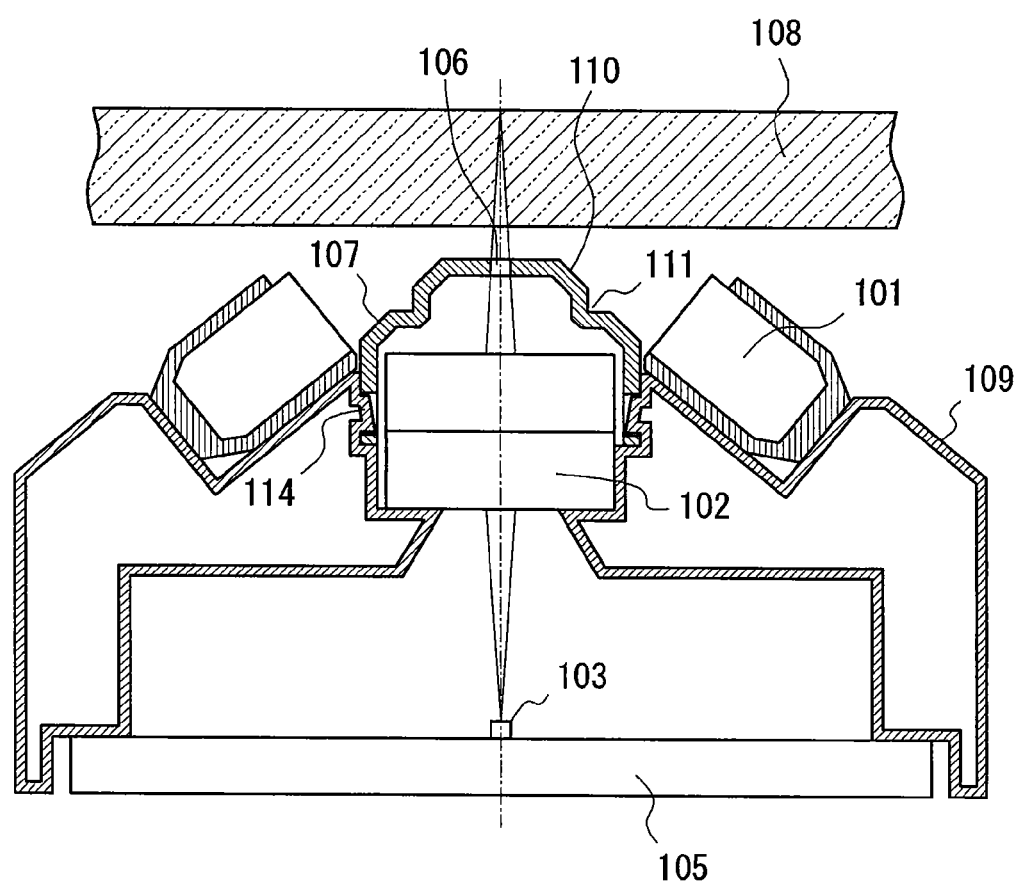
FIG. 23 is cross-sectional view illustrating a fitting of the housing and slit hood in a case that the slit hood is a cap-shaped one.

In order to assemble the cap-shaped hood 107 into the housing 109, the housing 109 is provided with the positioning protrusions 114 at several locations in a longitudinal direction of the slit hood 107, whilst the slit hood 107 is provided with the positioning holes 115 which may be fitted to the positioning protrusions 114 as shown in FIG. 23, or vice versa, and then the housing and slit hood are fitted.

According to the structure described above, the workability of assembling of the slit hood and housing is improved, resulting in the decrease of assembling cost.

Subsequently, the execution of a suitable surface treatment to a front and rear surface of the slit hood will now be described.

Figure 24:
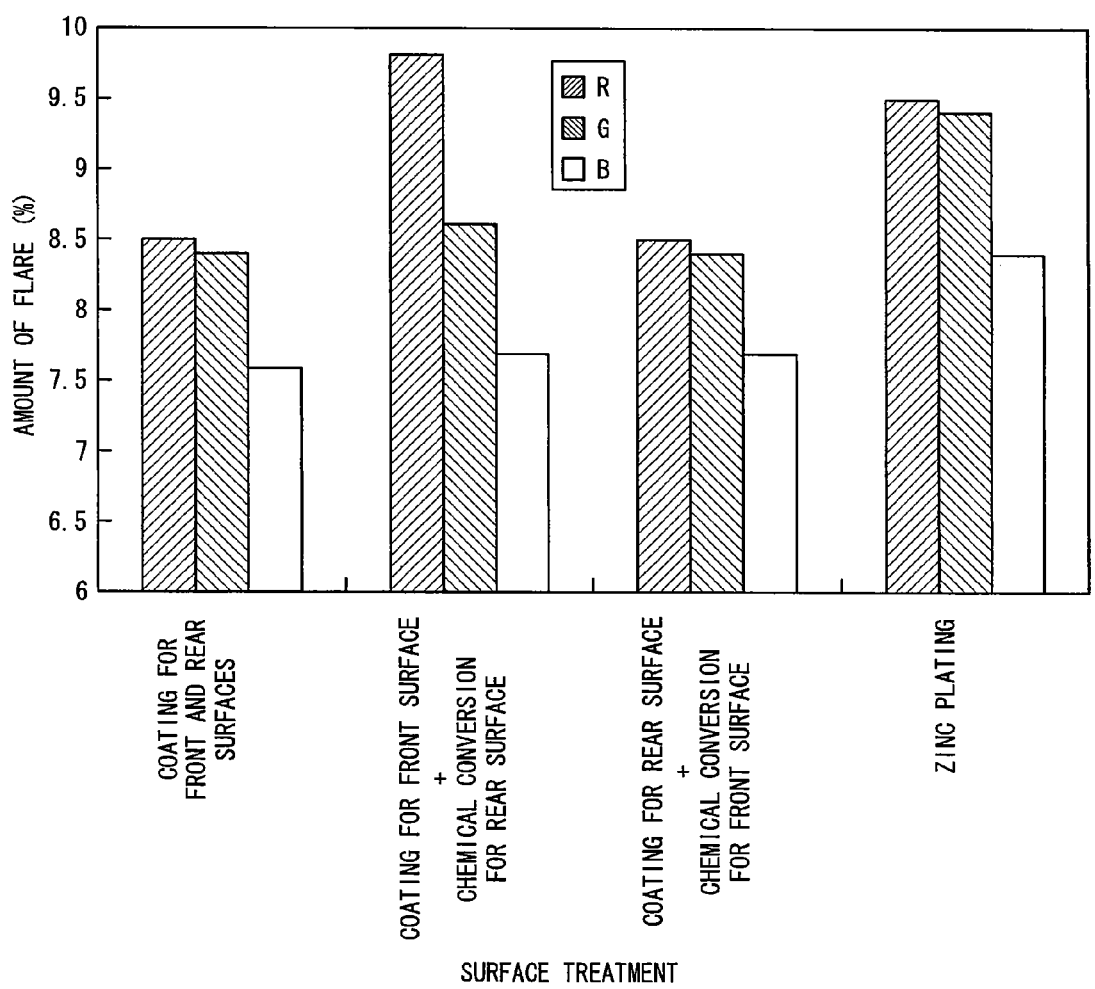
FIG. 24 is a graph showing a comparison result for the amount of generated flare (stray light) when different surface treatment was executed to a front and rear surfaces of the slit hood made of iron.

FIG. 24 shows an experiment result for the amount of generated flare (stray light) when different surface treatment was executed to a front surface (an original side) and a rear surface (a lens side) of the slit hood made of iron.

The experiment was carried out in such a manner that after different surface treatment was executed to a front and rear surfaces of the metal hood, red (R) light, green (G) light, and blue (B) light were irradiated to the front and rear surfaces of the metal hood to measure the amount of generated flare.

In FIG. 24, "coating" in abscissa means a spray treatment of black coating material. Coating was executed using Hino Black® commercially available from OHHINOKHOGYOH CO., LTD in the experiment. The surface of the metal hood after coating had a surface roughness like a pearskin finish. "chemical conversion" in abscissa means a oxidation treatment for producing a blackening of the surface of the metal hood by dipping it in agent to oxidize metal. The surface of the metal hood after chemical conversion had a surface roughness like a pearskin finish. "zinc plating" in abscissa means a zinc plating treatment for the surface of the metal hood. The surface of the metal hood was smooth after a zinc plating and was blackened.

As shown in FIG. 24, it is appreciated that the amount of generated flare was least in a case that the front and rear surfaces were subjected to coating, and the amount of generated flare was less in a case that the front surface was subjected to chemical conversion and the rear surface was subjected to coating.

On the contrary, the amount of generated flare of the red (R) light was more in a case that the front surface was subjected to coating and the rear surface was subjected to chemical conversion. This means that the cause of flare is mainly based on the reflection on the rear surface of the metal hood. Accordingly, it is effective to improve the reflectivity of the rear surface rather than the front surface of the metal hood.

In case of a zinc plating causing the front and rear surfaces smooth, the amount of flare was more in all the red (R), green (G), and blue (B) lights. There is no illustrated in FIG. 24, but the amount of flare was further increased in a case that the front and rear surfaces were subjected to chemical conversion.

It is appreciated from FIG. 24 that the amount of flare was least in a case that the front and rear surfaces were subjected to coating, resulting in an excellent quality. However, coating leads to high cost, so that it is preferable that the rear surfaces is subjected to coating and the front surface is subjected to chemical conversion.

Figure 25:
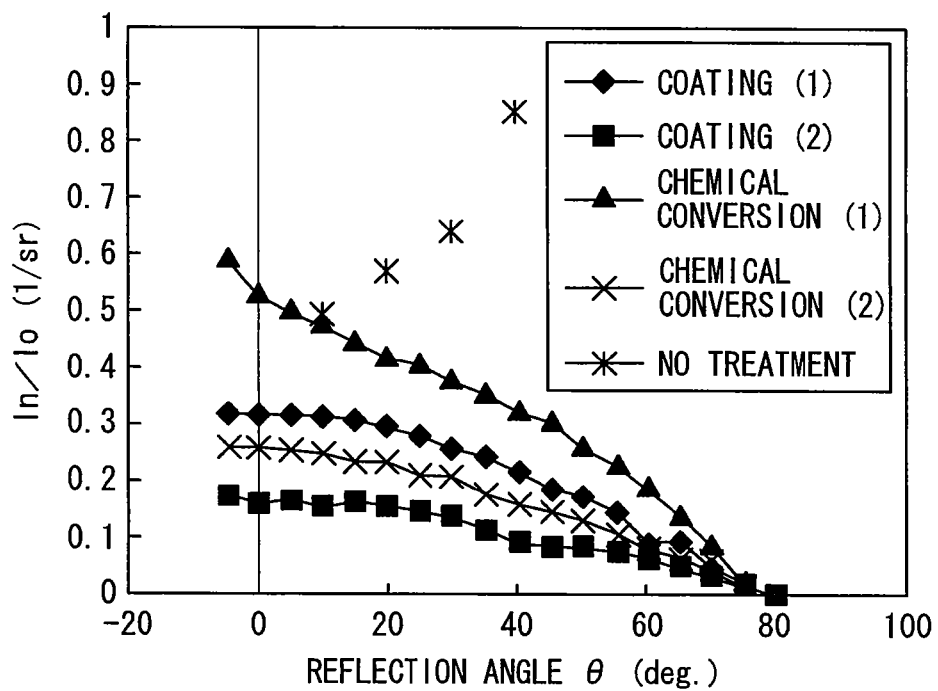
FIG. 25 is a graph showing a measurement result for the surface reflection of the metal hood in a case that the same surface treatment was executed to a front and rear surface, and in a case that no surface treatment was executed.

FIG. 25 shows a measurement result for the surface reflection of the metal hood in a case that the same surface treatment was executed to a front and rear surface, and in a case that no surface treatment was executed.

Figure 26:
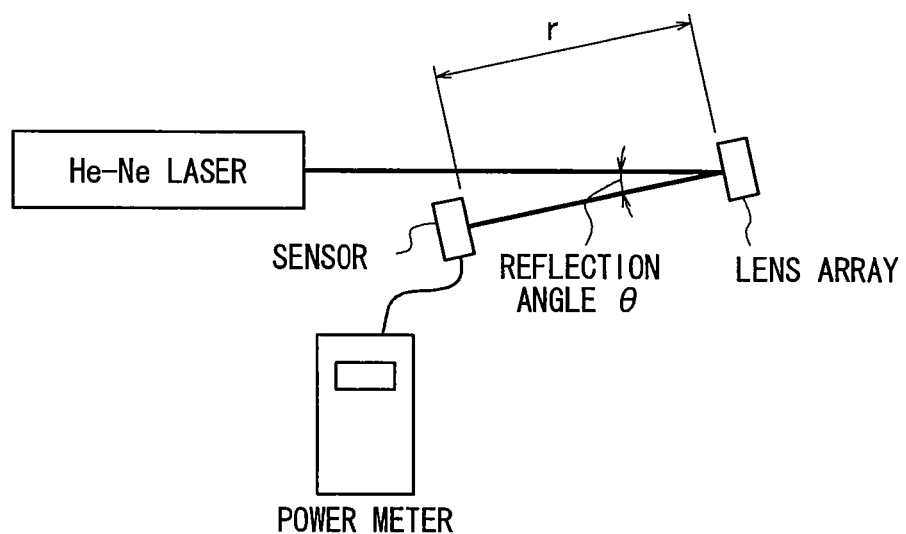
FIG. 26 is a schematic view illustrating the measurement of surface reflection.

In this measurement, a laser beam was irradiated to the lens array from an original side with the light sensor being arranged on an optical axis of the laser beam reflected at an angle θ on the lens array, and the reflected beam was measured by a power meter. A He-Ne laser of 633 nm, 5 mW and a power meter of Q8230 commercially available from ADVANTEST CORPORATION were used for measurement as shown in FIG. 26.

In FIG. 25, ordinate shows (In/Io)/solid angle (unit: 1/sr), i.e. the ratio (In/Io) is divided by the solid angle, herein In is a reflection measured value (a value of laser beam reflected at different angle measured by the power meter), and Io a laser output (a value of laser beam directly measured by the power meter).

The solid angle may be obtained as described below. On condition that the light-receiving area of the light sensor is A, and the distance from a laser beam reflection point to a light-receiving portion of the sensor is r, the solid angle is represented by $A/4\pi r^2$ (unit: sr(steradian)).

In FIG. 25, "coating treatment(1)" relates to a metal hood the front and rear surfaces thereof were subjected to coating, "coating treatment(2)" relates to a metal hood which was different from "coating treatment(1)" only in the kind of coating material to increase the surface roughness.

"chemical conversion treatment(1)" relates to a metal hood the front and rear surfaces thereof were subjected to chemical conversion, and the color thereof after treatment was gray. On the other hand, "chemical conversion treatment(2)" relates to a metal hood which was different from "chemical conversion treatment(1)" only in the surface color after treatment, and the surface color of the metal hood was black due to ferric oxide formed on the surface.

"No treatment" relates to a metal hood to which no treatment was executed.

It is appreciated from FIG. 25 that the metal hood in which the amount of reflected light was least was one subjected to coating treatment(2) for roughening the surface thereof. It is also appreciated that the metal hood subjected to coating or chemical conversion had less reflected light than that subjected no treatment. It is conceivable that the amount of reflected light is more in the metal hood subjected no treatment when the reflection angle θ is large, resulting in the cause of an image degradation.

It is appreciated from FIG. 25 that a preferable reflection quality is obtained when the reflectance In/Io (1/sr) is 0.6 or less in case of the reflection angle θ=0°, and the reflectance In/Io is 0.3 or less in case of the reflection angle θ=50°.

(C) Subsequently, the effective improvement in the accuracy of the position of a slit with respect to the optical axis and the accuracy of the distance between the reading optics and the original glass plate will now described.

In this case, a thin-walled metal hood is also used as in the above-described section (B). In addition, the slit hood and housing are provided with positioning holes, and the slit hood and housing are fixed to each other by inserting positioning pins into the positioning holes for increasing the positional accuracy of the slit with respect to the optical axis.

When the slit hood and housing are fixed by the positioning pins, the positioning pins are provided at the upper portions of both ends in a main scanning direction of the slit hood, the height of the positioning pin protruding from the upper surface of the slit hood is constant, and compressions coils are provided via the positioning pins to press the slit hood toward the original glass plate, resulting in the improvement of the accuracy of the distance between the reading optics and the original glass plate. It is herein noted that the original glass plate may be made of a transparent material such as plastic.

When the housing including a reading optics is mounted on a base frame, the structure such that the housing is not detached from the base frame is adopted to facilitate its carrying and handling.

Subsequently, the assembling of the slit hood and housing in a typical example in which a rod-shaped light source is arranged on both sides of a planar lens array, respectively, will now be described.

Figure 27:
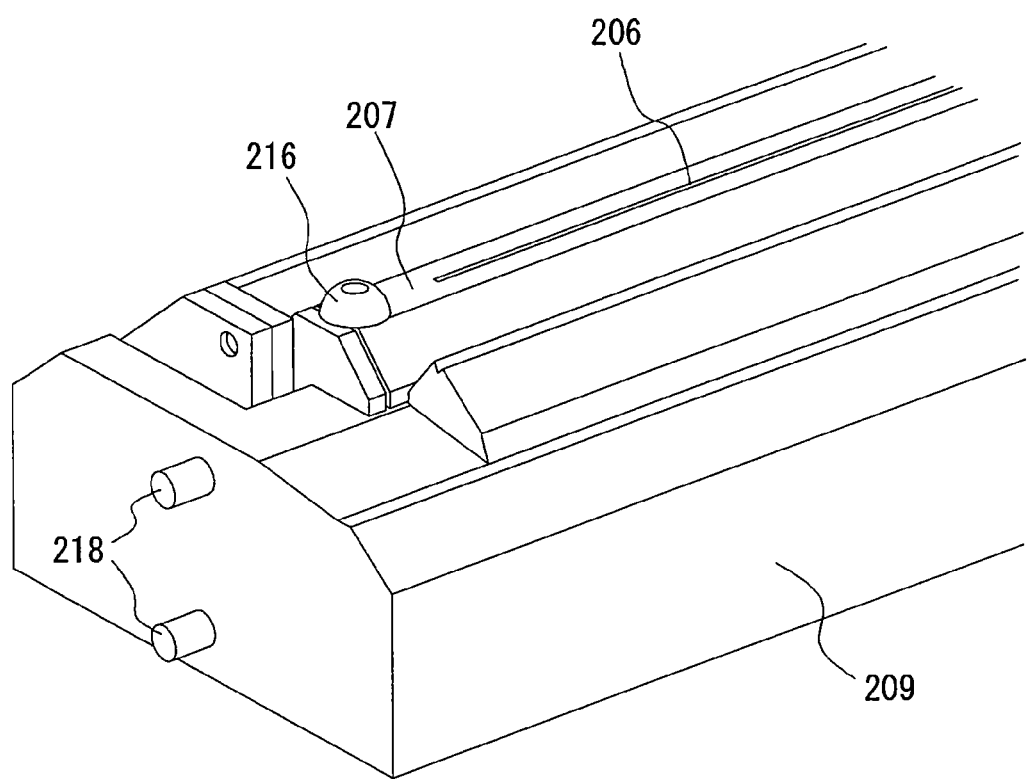
FIG. 27 is a perspective view illustrating the fixing of the slit hood and housing by inserting the positioning pins into the positioning holes opened in the slit hood and housing.
Figure 28:
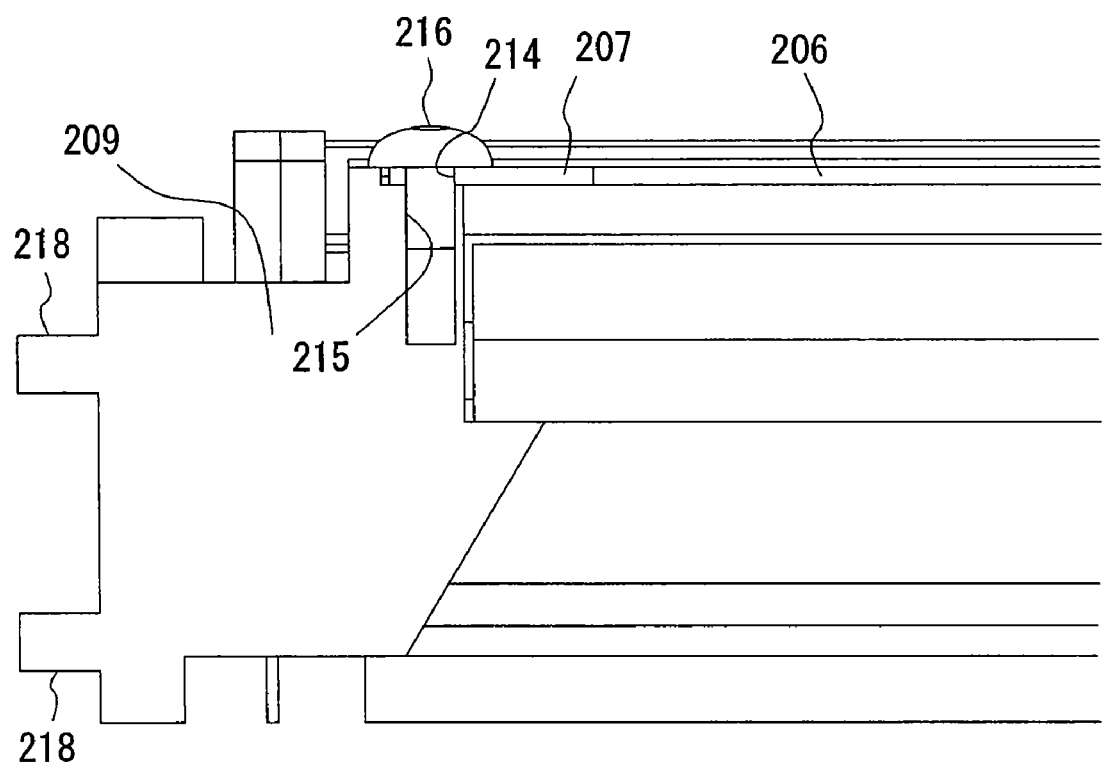
FIG. 28 is a cross-sectional view illustrating the fixing of the slit hood and housing by inserting the positioning pins into the positioning holes opened in the slit hood and housing.

As shown in FIGS. 27 and 28 for example, the positioning holes are formed at the upper portion of both ends of the slit hood in a main scanning direction and at the corresponding portion of the housing, and then the positioning pins are inserted into the positioning holes to fix the metal hood and housing. In the figures, reference numeral 214 designates the positioning hole opened in the slit hood, reference numeral 215 the positioning hole opened in the housing, and reference numeral 216 the positioning pin.

In this manner, the slit hood 207 and housing 209 are provided with the positioning holes 214 and 215 having the same diameter, and then the positioning pins 216 are inserted into the positioning holes 214 and 215 to fix the slit hood and housing. As a result, the positional accuracy of the slit with respect to the optical axis in any of main-scanning and sub-scanning directions may be improved.

This effect may be further increased by combining the structure in which positioning protrusions are provided at one of the bottom portions of the cap-shaped hood and the corresponding portions of the housing, and positioning holes or recesses are provided at the other of the bottom portions of the cap-shaped hood and the corresponding portions of the housing, the positioning protrusions being fitted to the positioning holes or recesses as shown in FIG. 23.

Figure 29:
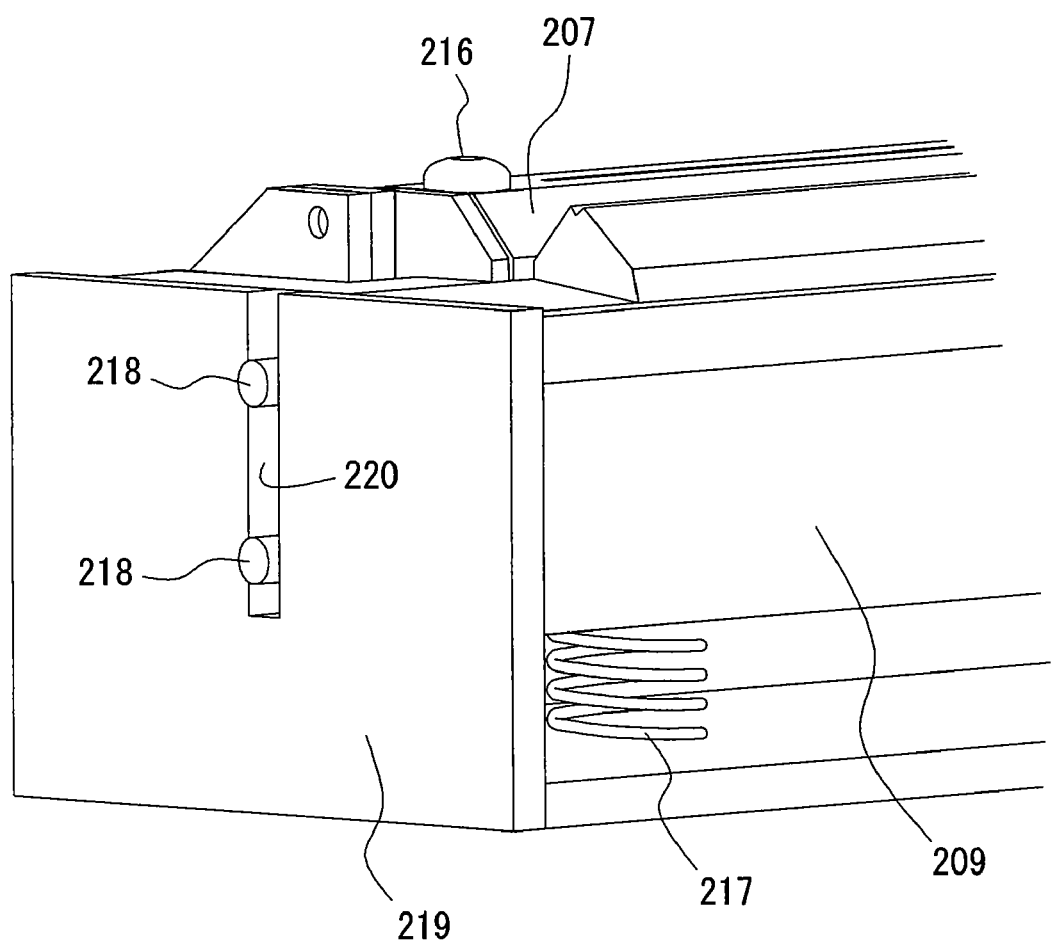
FIG. 29 is a perspective view illustrating the pressing of the slit hood to the original glass plate by using a compression spring.

The height of the positioning pin 216 protruding from the upper surface of the slit hood is constant as described above, and the slit hood 207 is pressed to the original glass plate 108 by using a compression spring 217 as shown in FIG. 29. As a result, the distance between the optics and the original glass plate may be held constant to increase remarkably the accuracy of the distance therebetween.

For this purpose, it is preferable that the top of head of the positioning pin 216 is flat. As a material of the positioning pin 216, UPE (super-high molecular polyethylene), PEEK (polyether ether ketone), and MC nylon, etc. are preferable.

According to the present invention, as shown in FIG. 29, the mechanism such that the slit hood is pressed to the original glass plate by the compression coil via the positioning pin is adopted, so that it is required that a pair of protrusions 218 are provided on both sides of the housing 209 in a main-scanning direction and notched paths 220 are formed at both sides of a base frame 219 accommodating the housing 209, the protrusion 218 being guided through the notched path 220.

However, the notched path 220 is composed of only a vertical path as shown in FIG. 29, there is a risk such that the housing 209 trips from the base frame 219 by the reaction force of the compression coil 217 during carrying or holding the image sensor.

Figure 30:
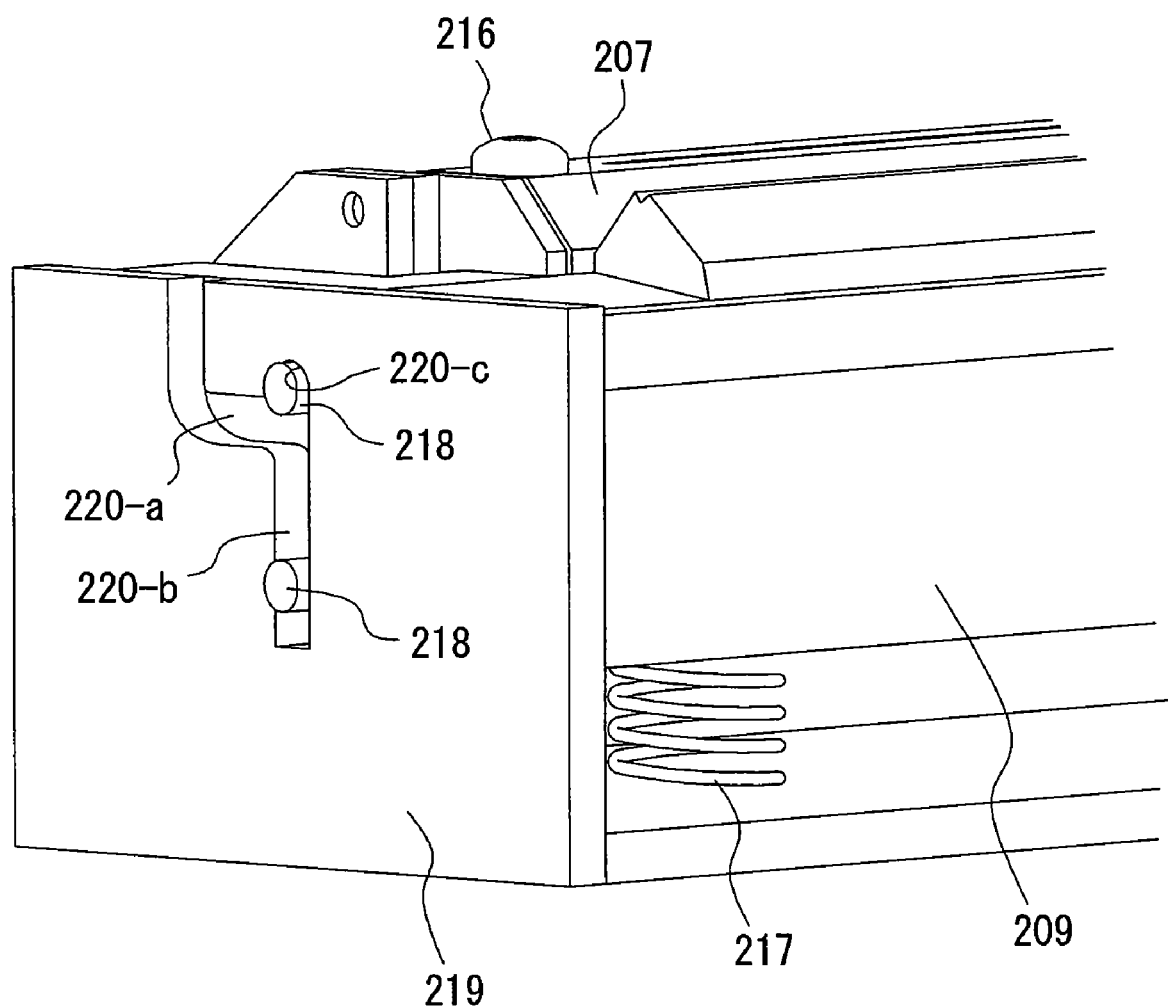
FIG. 30 is a schematic view illustrating a composite path composed of a curbed path and vertical path.

In order to avoid such a risk, the notched path 220 is formed so as to be a composite path composed of a curbed path 220-*a* and vertical path 220-*b* as shown in FIG. 30, and the upper portion of the vertical path 220-*b* is provided with the evacuation area 220-*c* for the upper one of a pair of protrusions 218.

According to such a structure, there is no risk such that the housing 209 trips from the base frame 219 during carrying or handling the image sensor. Also, the slit hood may be pressed to the original glass plate by a suitable pressure on the basis of the reaction force of the compression spring 217 while the image sensor is mounted to an image reading device.

A compact image reading device having a superior light-receiving accuracy may be implemented by mounting the image sensor described above on an image reading device.

The invention claimed is:

1. An image sensor comprising a rod-shaped light source for irradiating light to an original placed on an original glass plate, an imaging optics for focusing light reflected on the original, and a light-receiving element for receiving light passing through the imaging optics, the light-receiving element being positioned at a predetermined location on a substrate which is provided with through holes for terminals of lead frames of the rod-shaped light source, characterized in that the terminals of lead frames of the rod-shaped light source are bent toward the center of the substrate to be connected with the through holes via an electrical conductor, and wherein a metal thin-walled hood having a slit for passing the light reflected on the original is provided between the original and the imaging optics, the metal hood being accommodated in a housing together with the rod-shaped light source, the imaging optics and the substrate on which the light-receiving element is provided.

2. An image sensor according to claim 1, wherein
    positioning holes are formed at the upper portion of the metal hood at both ends in a main scanning direction and at the corresponding portion of the housing, and then positioning pins are inserted into the positioning holes to fix the metal hood and housing,
    compression coils are provided to press the housing to the original plate via the positioning pins, and
    a pair of protrusions are provided on both sides of the housing in a main-scanning direction and notched paths for guiding the pair of protrusions are formed at both sides of a base frame accommodating the housing.

3. An image sensor according to claim 2, wherein the notched path is formed so as to be a composite path composed of a curbed path and vertical path, and the upper portion of the vertical path is provided with an evacuation area for the upper one of a pair of protrusions.

4. An image sensor according to claim 1, wherein a corner portion of the metal hood is chamfered.

5. An image sensor according to claim 1, wherein a bent portion is provided to the metal hood along a longitudinal direction of the slit to increase the strength of the metal hood.

6. An image sensor according to claim 1, wherein the slit is opened by punching out the metal hood from the incident side of light.

7. An image sensor according to claim 1, wherein one of the metal hood and housing is provided with positioning protrusions, and the other thereof is provided with positioning holes or recesses to be fitted to the positioning protrusions.

8. An image sensor according to claim 7, wherein the length of the positioning hole or recesses in a longitudinal direction of the slit is longer than that of the positioning protrusion.

9. An image sensor according to claim 1, wherein the rod-shaped light source is arranged on both sides of the imaging optics, respectively.

10. An image sensor according to claim 9, wherein the metal hood is a cap-shaped one, and one of the metal hood and housing is provided with positioning protrusions, and the other thereof is provided with positioning holes or recesses to be fitted to the positioning protrusions.

11. An image sensor according to claim 1, wherein a blackening coating is executed on the front surface of the metal hood, and a blackening coating or blackening chemical conversion is executed on the rear surface of the metal hood.

12. An image sensor according to claim 11, wherein a reflectance In/Io (1/sr) is 0.6 or less in case of a reflection angle θ=0°, and the reflectance In/Io is 0.3 or less in case of the reflection angle θ=50°.

13. An image sensor according to claim 1, wherein a transparent film is provided to cover the slit for preventing foreign material from invading into the metal hood.

14. An image reading device comprising an image sensor according to claim 1.

* * * * *

UNITED STATES PATENT AND TRADEMARK OFFICE
CERTIFICATE OF CORRECTION

PATENT NO. : 8,199,377 B2  
APPLICATION NO. : 11/916759  
DATED : June 12, 2012  
INVENTOR(S) : Masahide Wakisaka and Harunobu Yoshida Page 1 of 1

It is certified that error appears in the above-identified patent and that said Letters Patent is hereby corrected as shown below:

On the Title page, Item 22, "May 6, 2006" should be --June 5, 2006--.

Signed and Sealed this  
First Day of January, 2013

David J. Kappos  
*Director of the United States Patent and Trademark Office*